(12) United States Patent
Wilson et al.

(10) Patent No.: US 11,736,458 B2
(45) Date of Patent: Aug. 22, 2023

(54) METHOD AND SYSTEM FOR SECURELY APPLYING A STACKABLE SYSTEM ROLE TO AN INFORMATION HANDLING SYSTEM

(71) Applicant: Dell Products L.P., Hopkinton, MA (US)

(72) Inventors: Lucas Avery Wilson, Cedar Park, TX (US); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 158 days.

(21) Appl. No.: 17/238,969

(22) Filed: Apr. 23, 2021

(65) Prior Publication Data
US 2022/0345449 A1 Oct. 27, 2022

(51) Int. Cl.
| | |
|---|---|
| *G06F 21/71* | (2013.01) |
| *G06F 21/62* | (2013.01) |
| *H04L 9/40* | (2022.01) |
| *G06F 21/78* | (2013.01) |

(52) U.S. Cl.
CPC ...... *H04L 63/0435* (2013.01); *H04L 63/0876* (2013.01); *H04L 63/102* (2013.01); *H04L 63/105* (2013.01)

(58) Field of Classification Search
None
See application file for complete search history.

(56) References Cited

U.S. PATENT DOCUMENTS

| | | | |
|---|---|---|---|
| 10,742,716 B1 | 8/2020 | Finkelstein et al. | |
| 11,188,681 B2 * | 11/2021 | Cohen | G06F 21/629 |
| 2011/0293096 A1 * | 12/2011 | Reilly | H04L 9/0833 |
| | | | 380/277 |
| 2014/0136481 A1 | 5/2014 | Quan et al. | |
| 2018/0183590 A1 * | 6/2018 | Kuo | H04L 9/0838 |
| 2020/0128020 A1 | 4/2020 | Abduljaber et al. | |
| 2020/0137581 A1 | 4/2020 | Gibson et al. | |
| 2021/0400489 A1 | 12/2021 | Starsinic et al. | |
| 2022/0191693 A1 * | 6/2022 | Sullivan | H04L 9/321 |

OTHER PUBLICATIONS

DPTSV: A Dynamic Priority Task Scheduling Strategy for TSS Deadlock Based on Value Evaluation. Bo . (Year: 2016).*
TSD: A Flexible Root of Trust for the Cloud. Chang. IEEE. (Year: 2012).*
Benefits and Challenges of Managing Heterogeneous Data Centers. Hwang. IEEE. (Year: 2013).*
A self-adaptive system for vehicle information security applications. Huang. IEEE. (Year: 2015).*

* cited by examiner

*Primary Examiner* — Venkat Perungavoor
(74) *Attorney, Agent, or Firm* — Chamberlain, Hrdlicka, White, Williams, & Aughtry

(57) ABSTRACT

A method for managing information handling systems includes obtaining, by a stackable system role (SSR) manager of an information handling system, an SSR instruction, performing an encoding on the SSR instruction using a public key to obtain an encoded instruction value, providing an encoded SSR instruction to a local hardware resource manager of the information handling system, wherein the encoded SSR instruction comprises the SSR instruction and the encoded instruction value, obtaining, from the hardware resource manager, a response, wherein the response specifies whether the encoded SSR instruction is valid, and based on the response, initiating an execution of the SSR instruction.

14 Claims, 16 Drawing Sheets

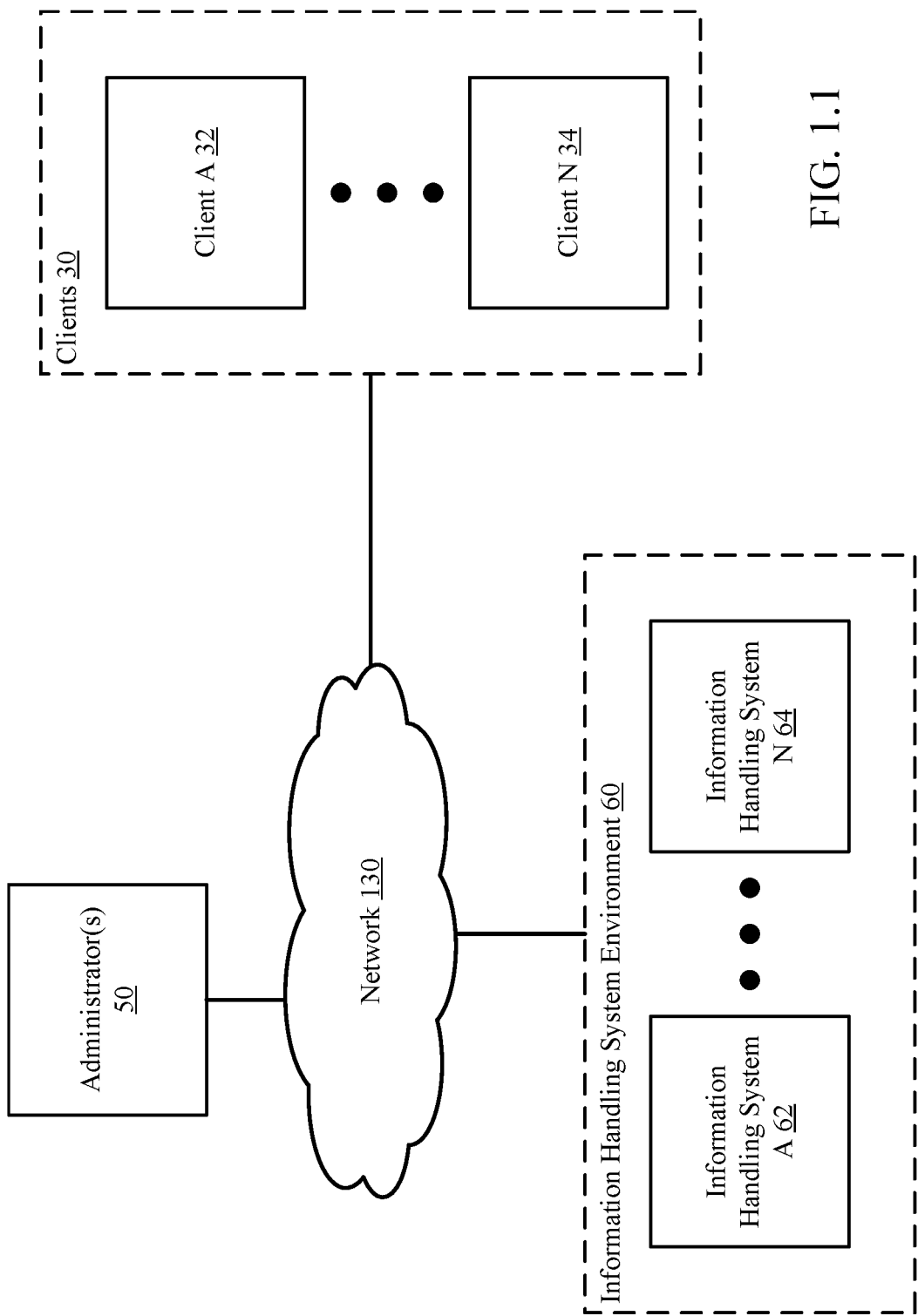
FIG. 1.1

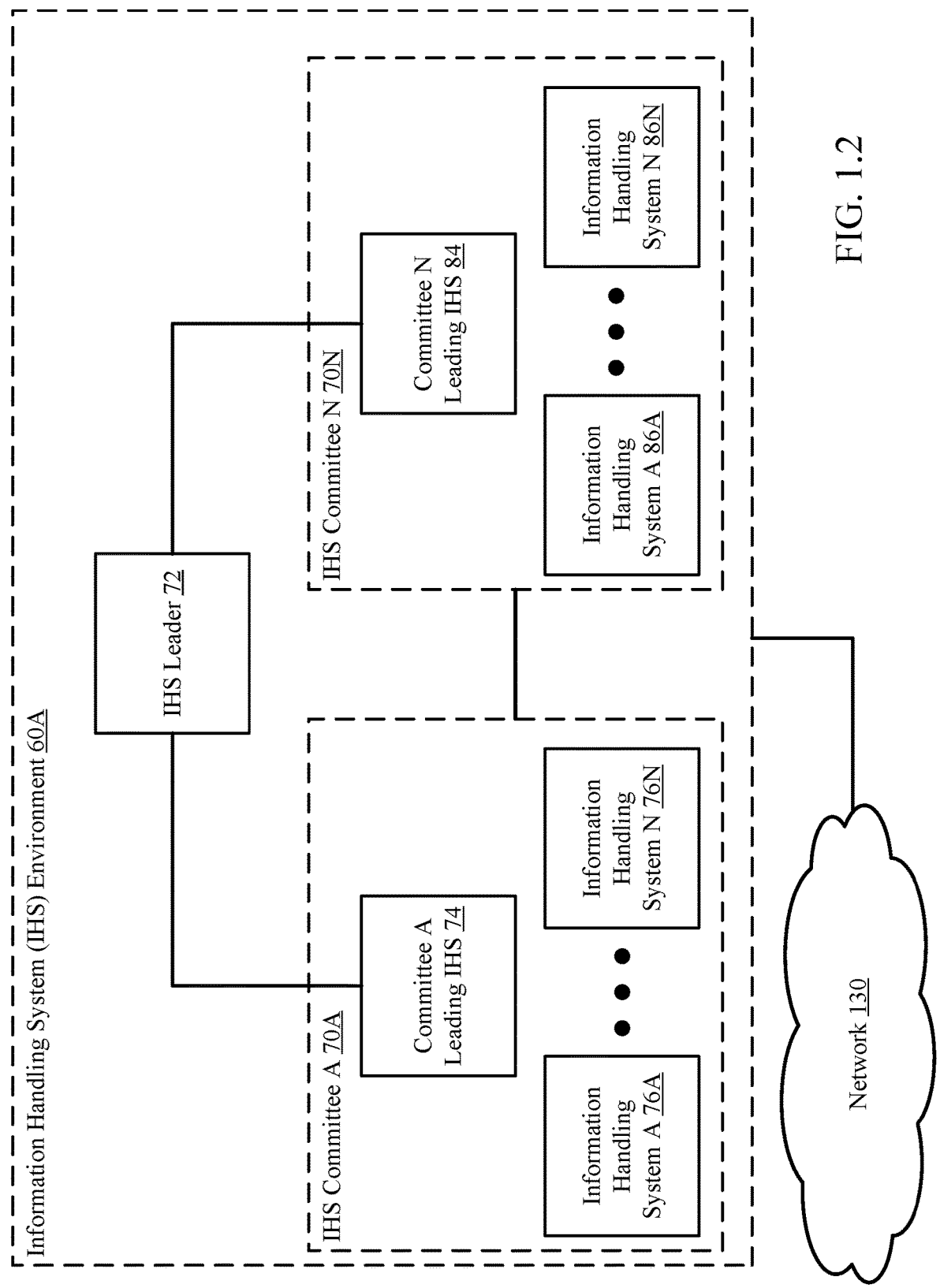
FIG. 1.2

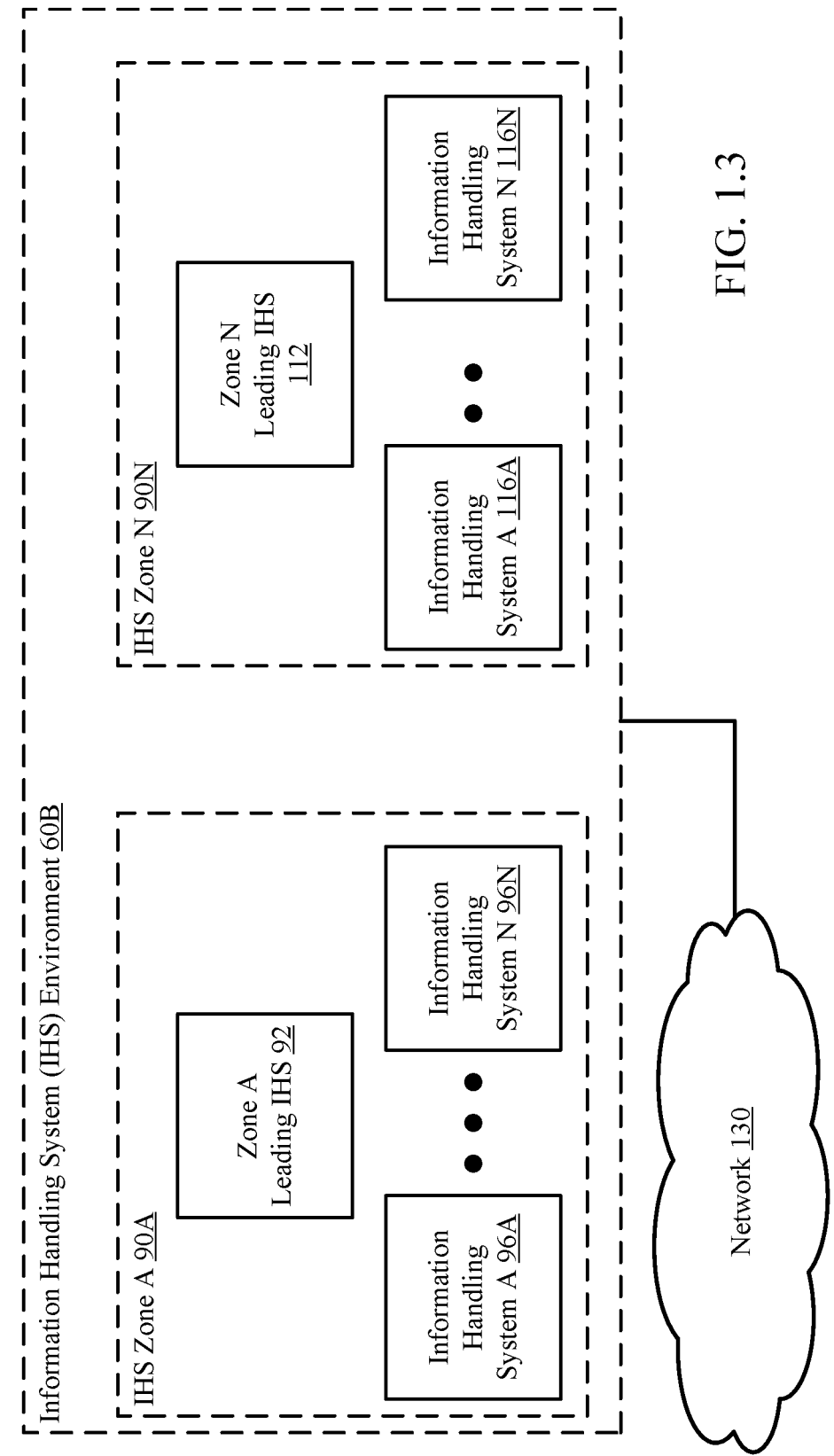
FIG. 1.3

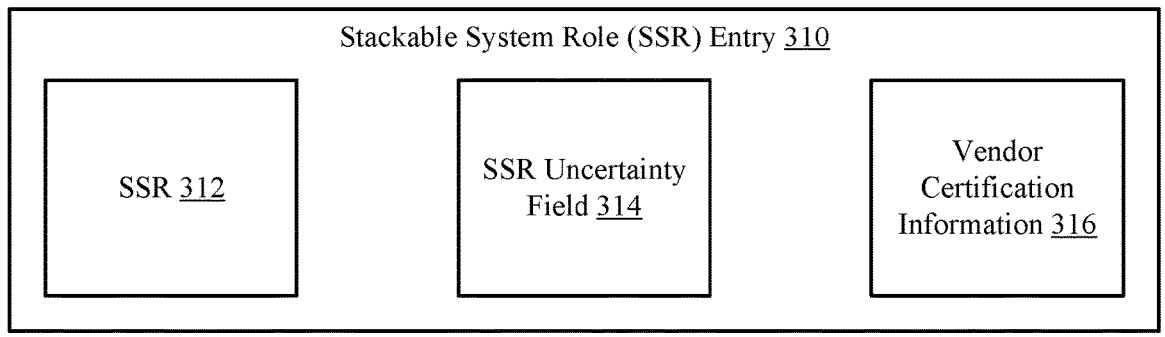
FIG. 3.1
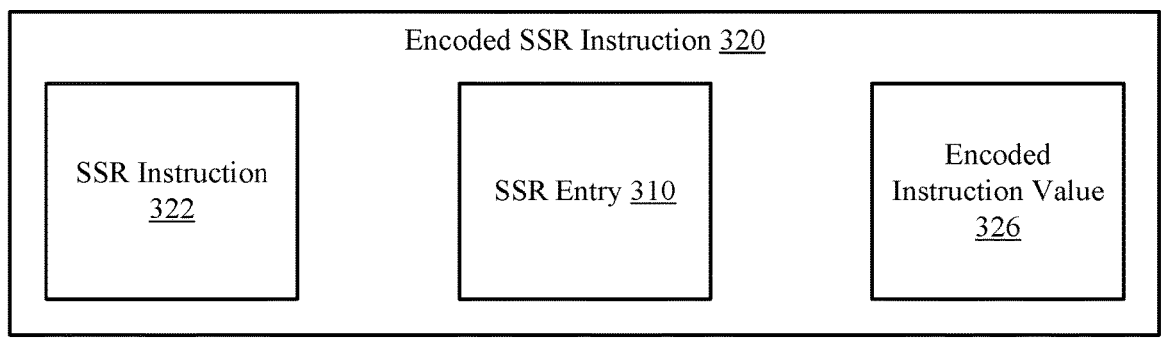
FIG. 3.2

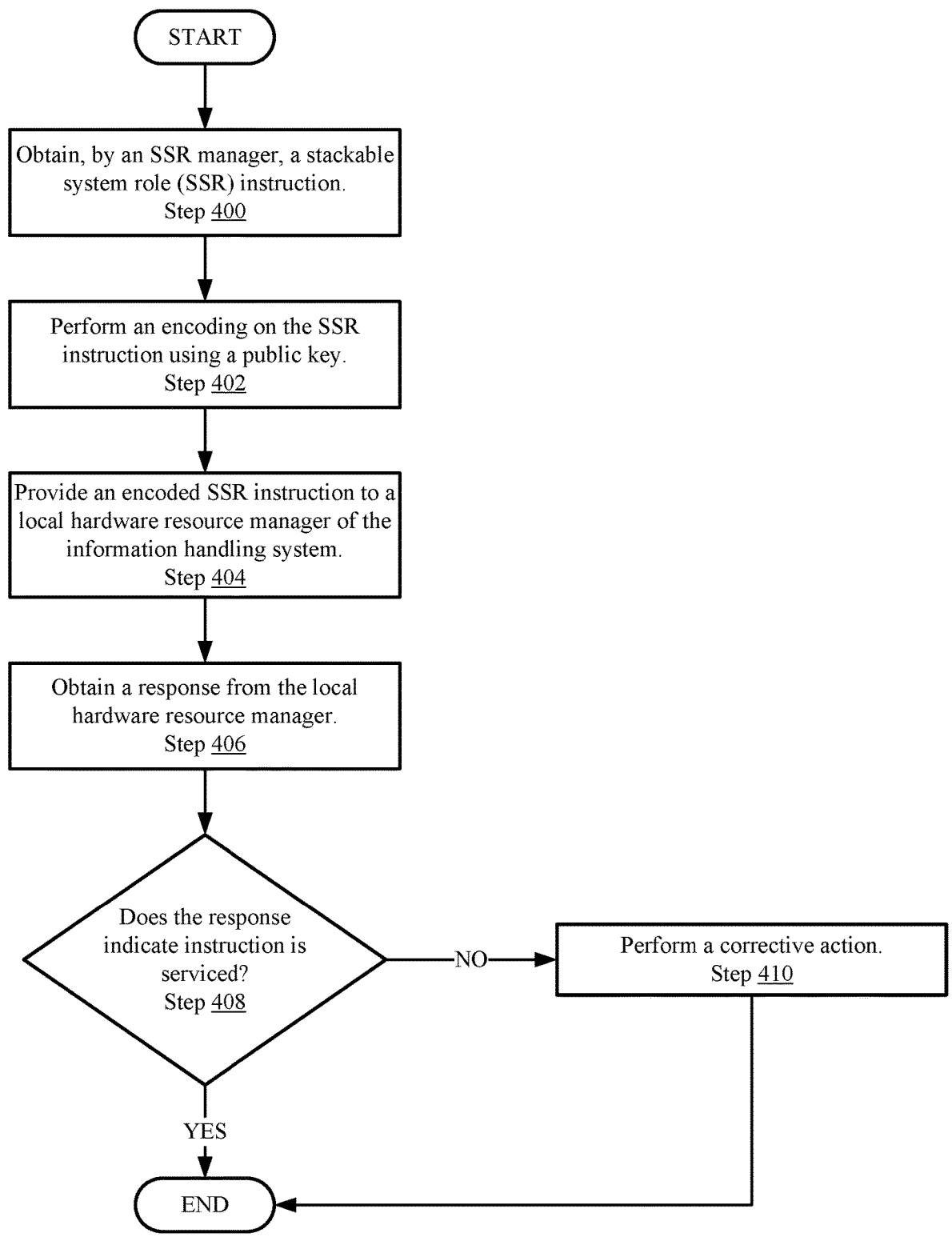
FIG. 4.1

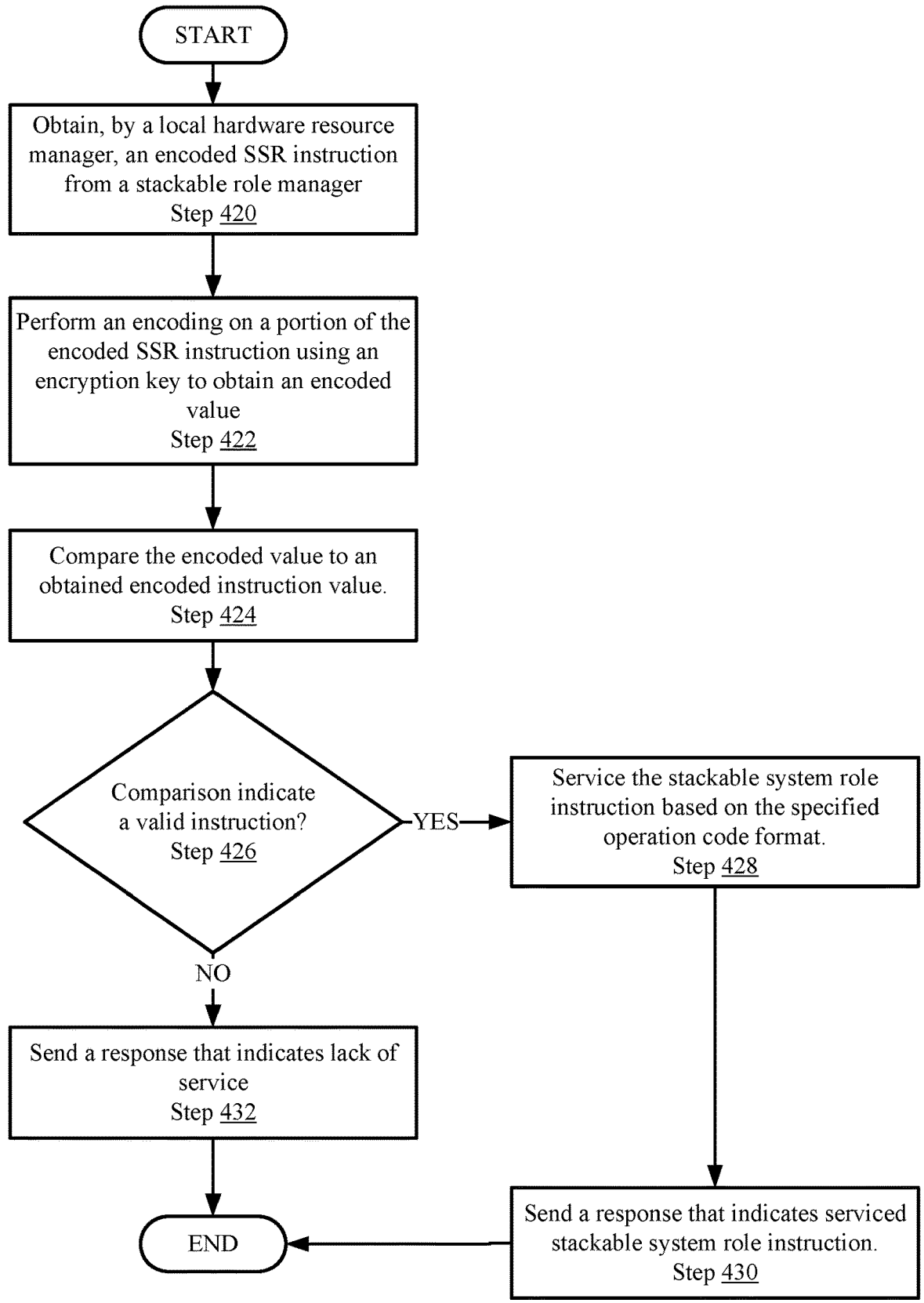
FIG. 4.2

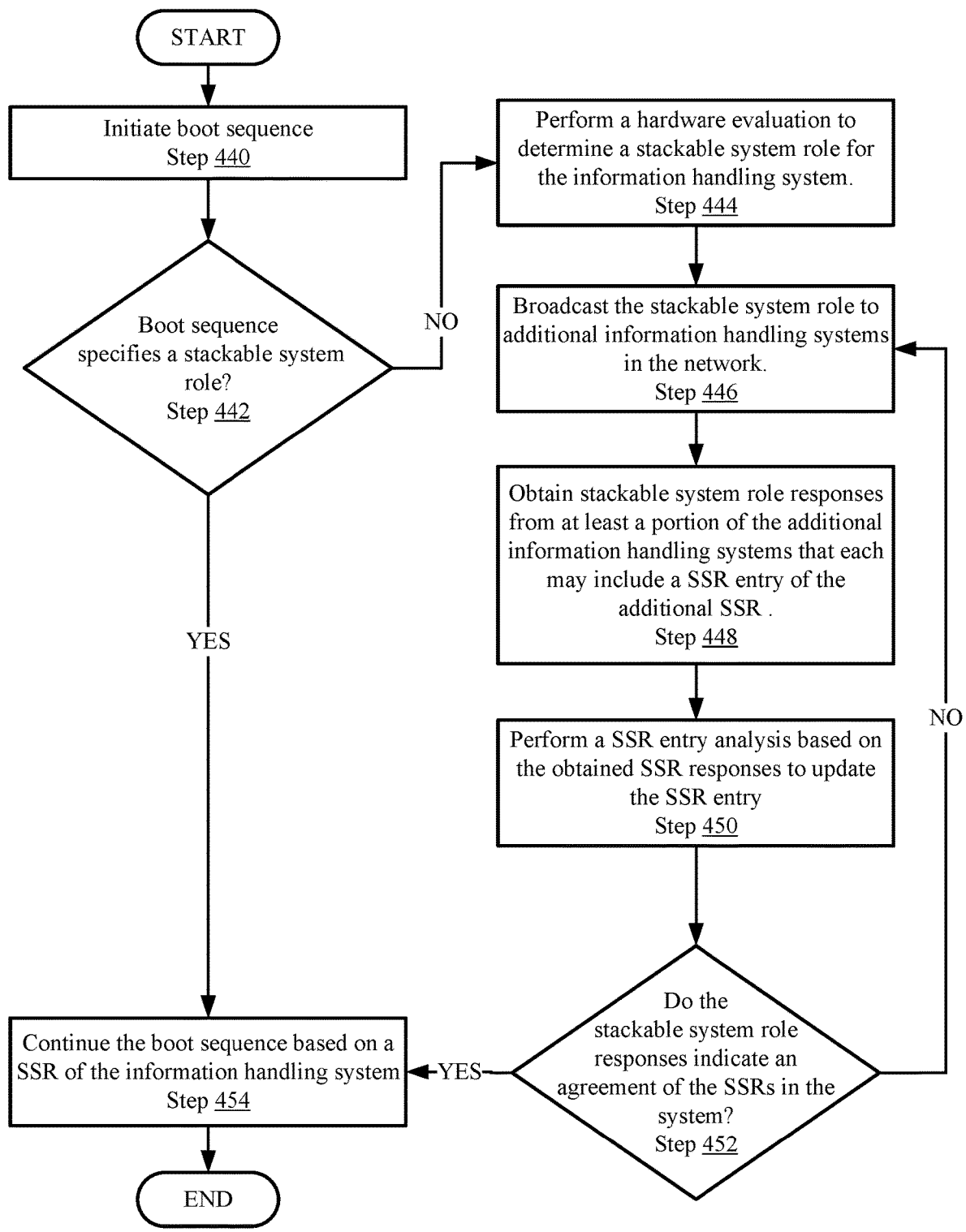
FIG. 4.3

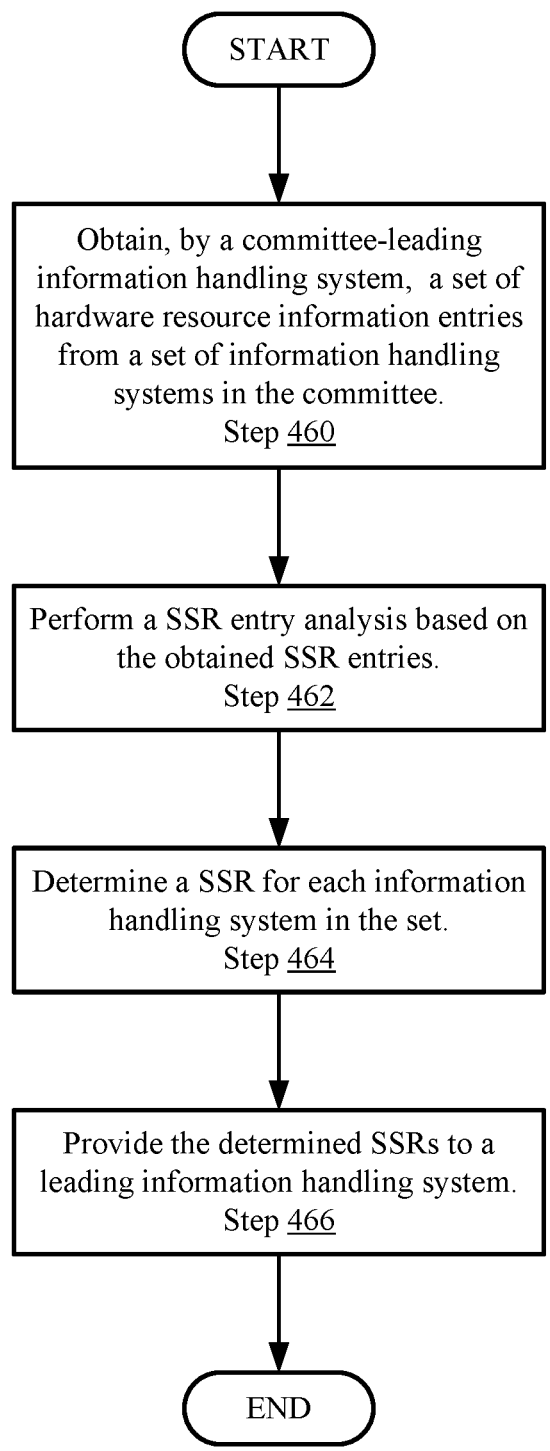
FIG. 4.4

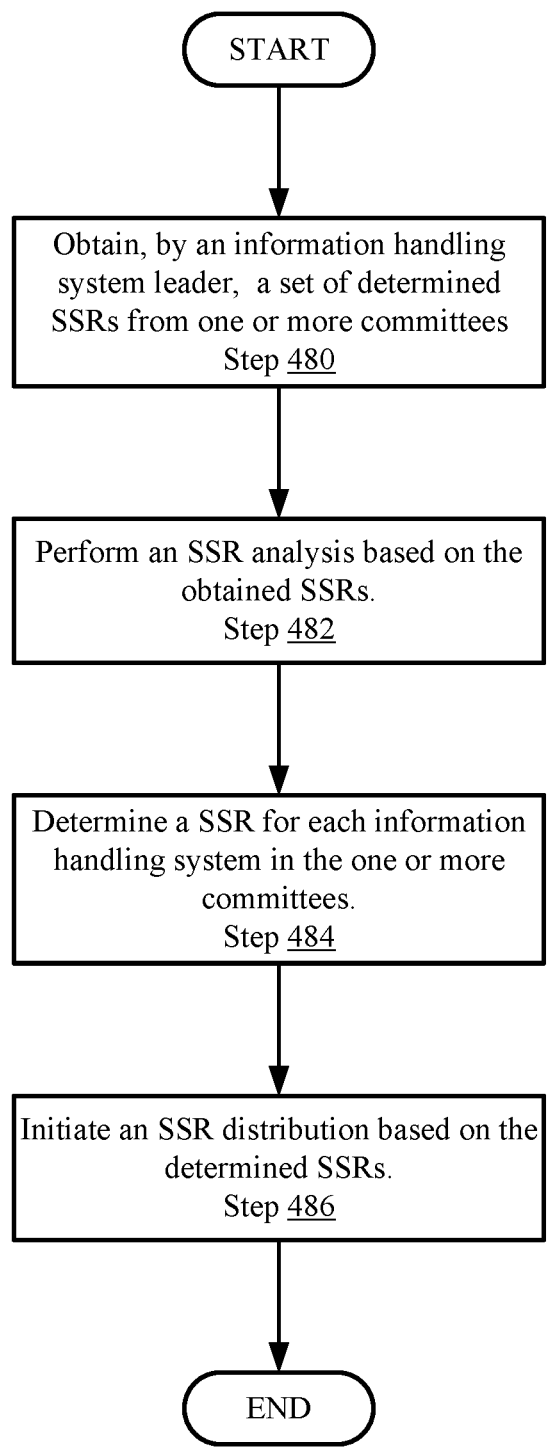
FIG. 4.5

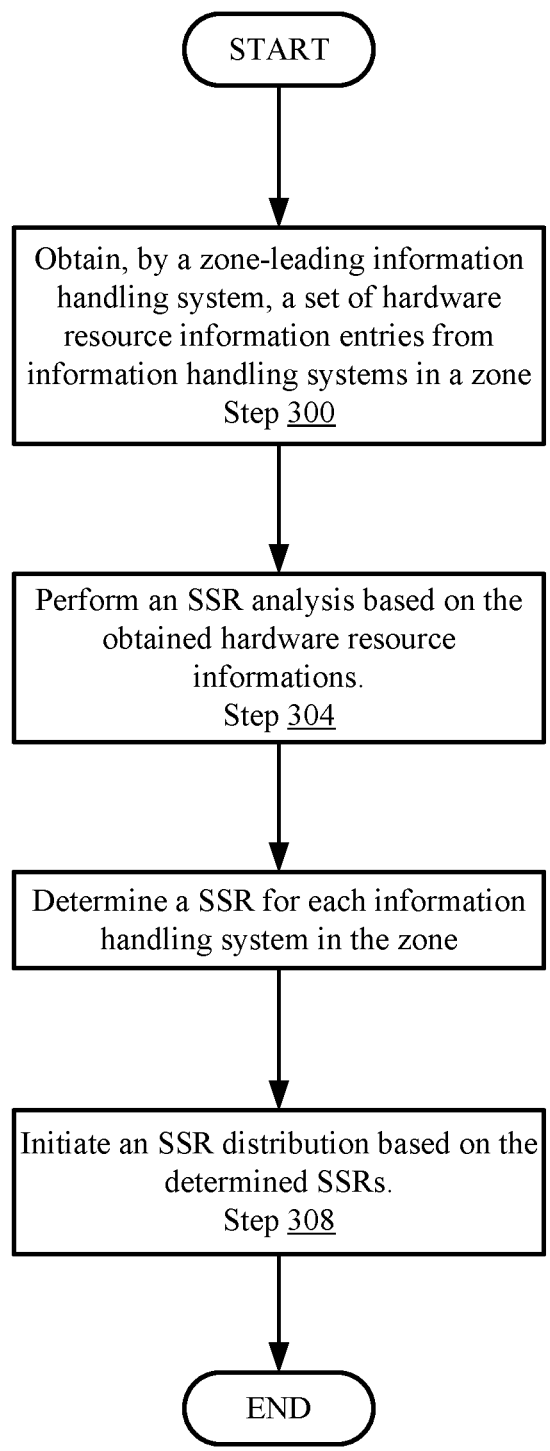
FIG. 4.6

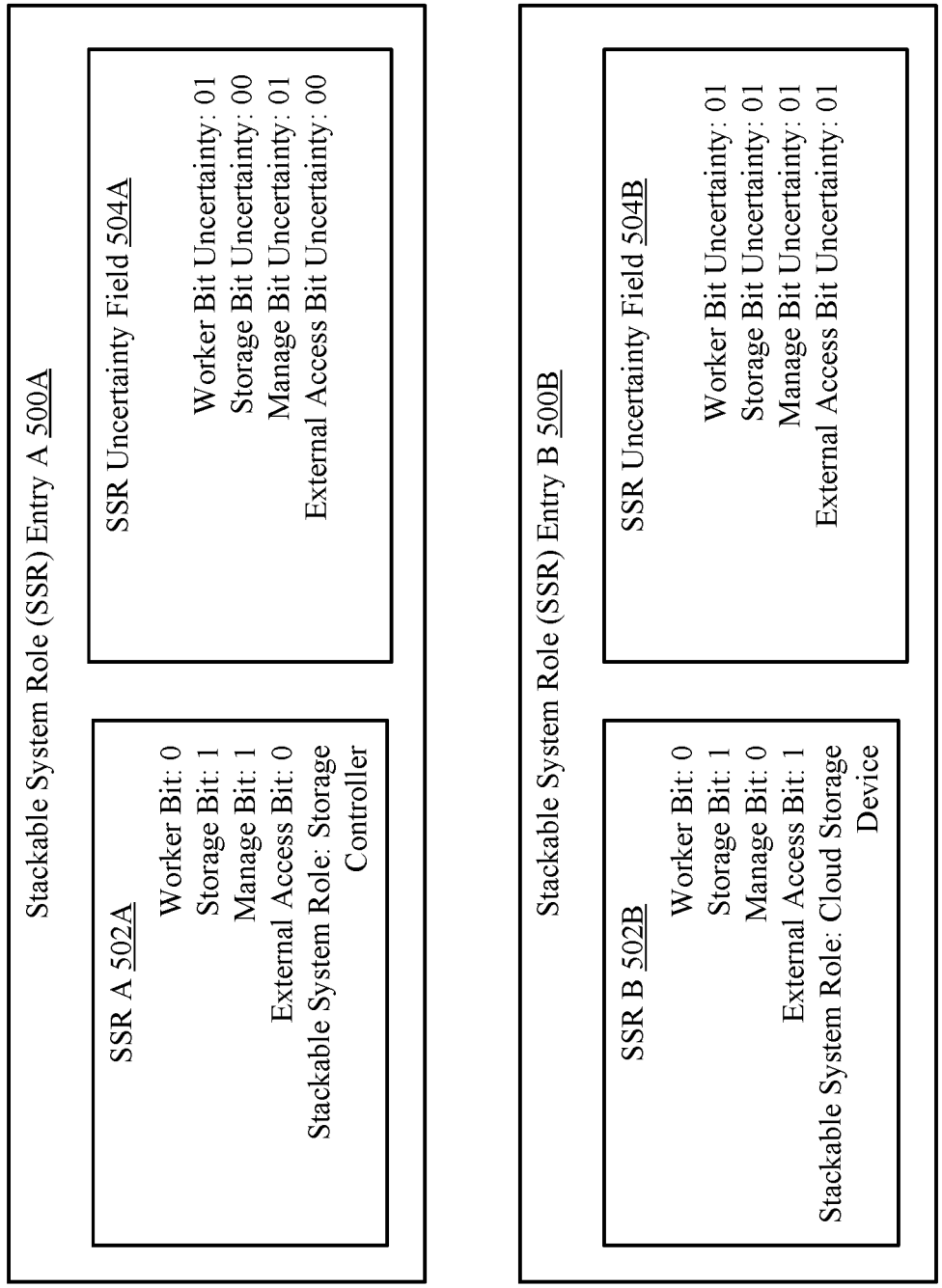
FIG. 5.1

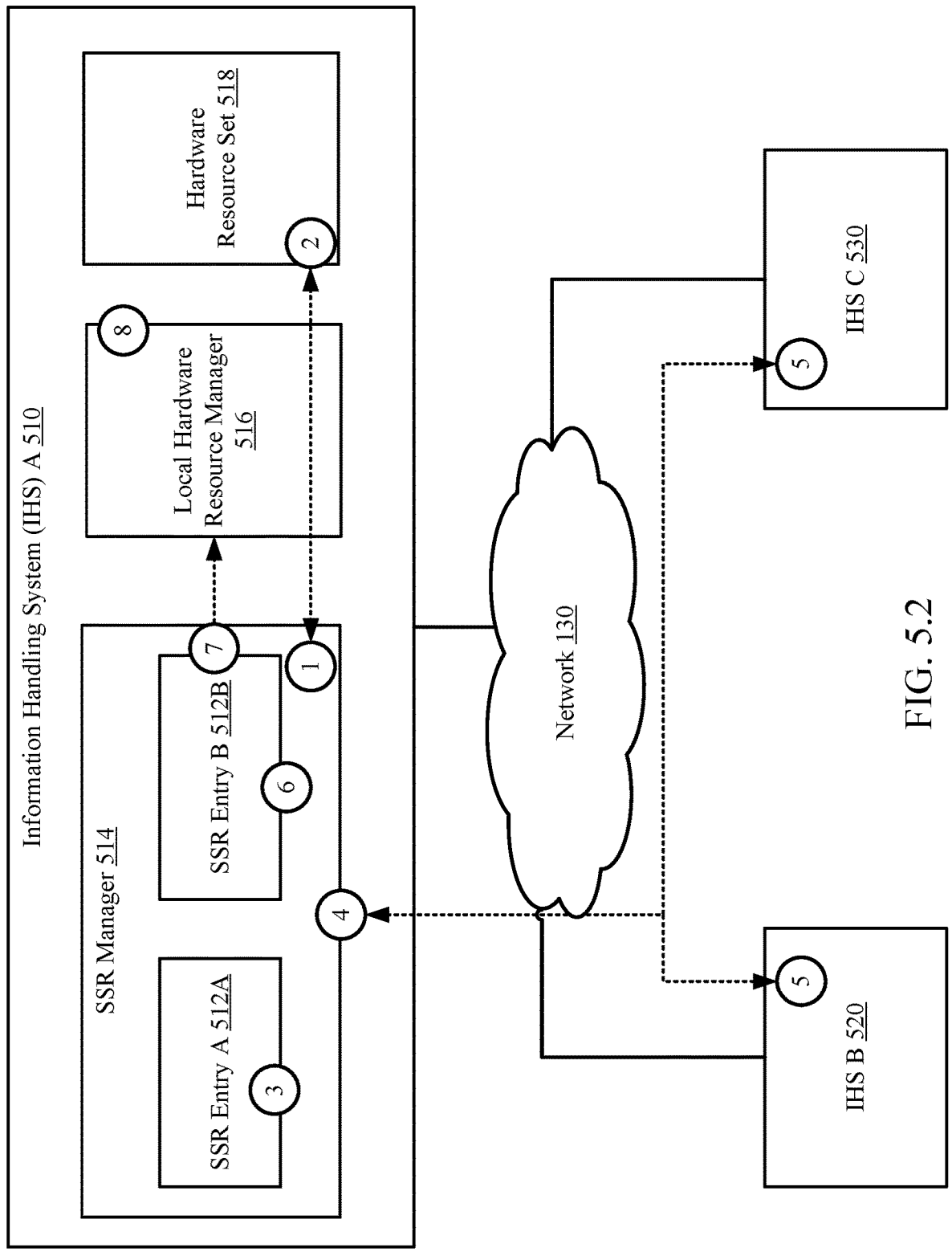
FIG. 5.2

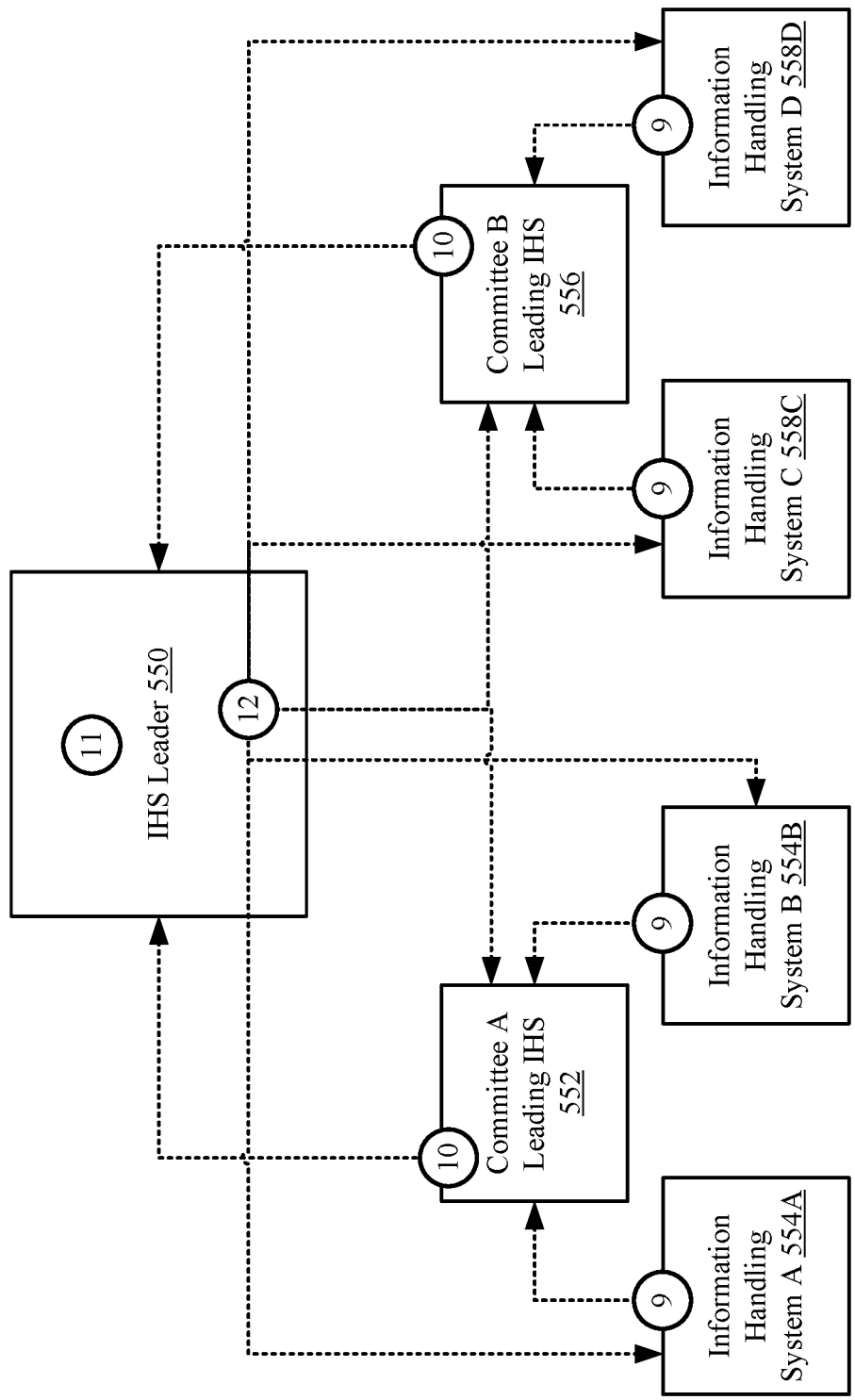
FIG. 5.3

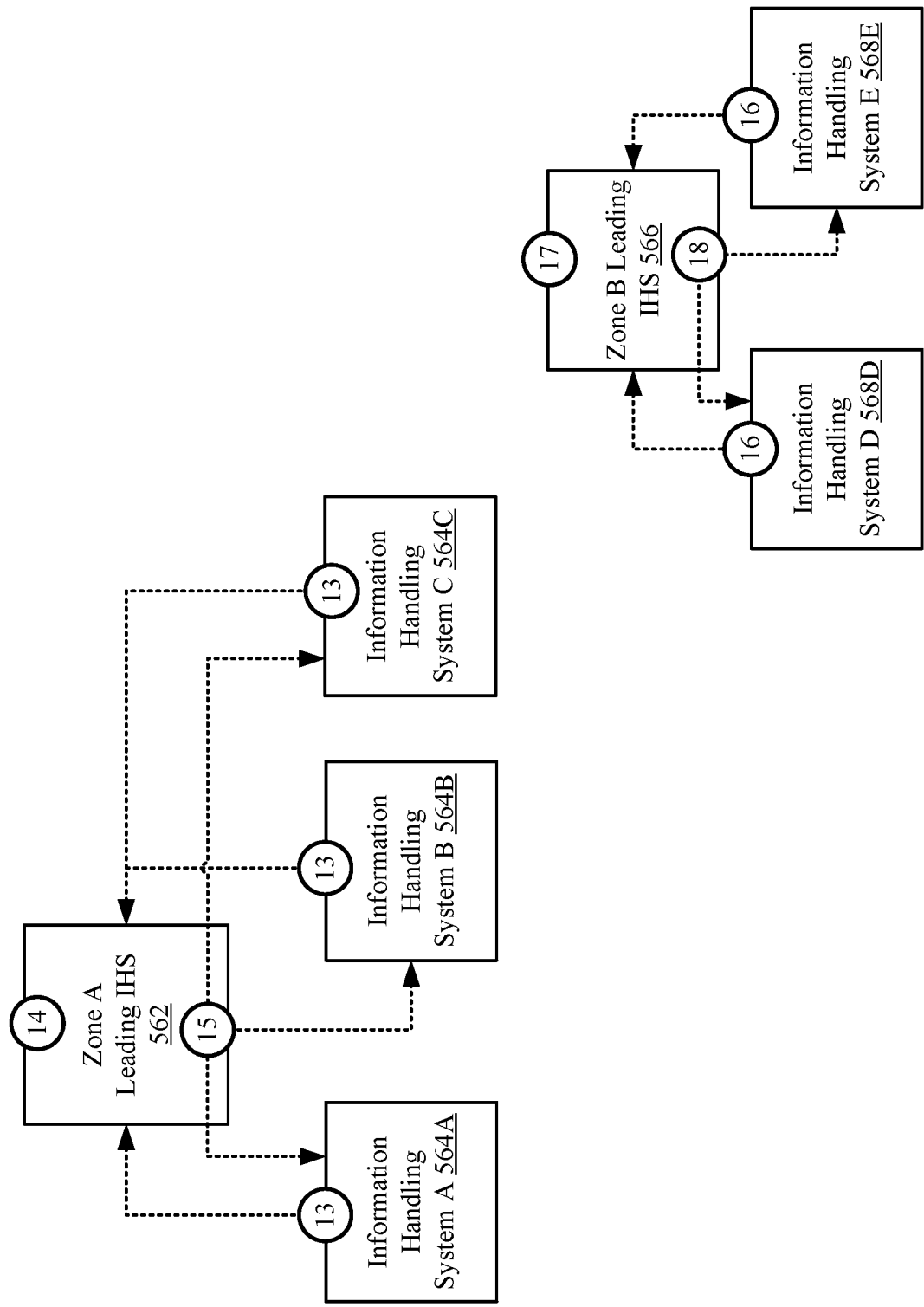
FIG. 5.4

METHOD AND SYSTEM FOR SECURELY APPLYING A STACKABLE SYSTEM ROLE TO AN INFORMATION HANDLING SYSTEM

BACKGROUND

Computing devices may provide services. To provide the services, the computing devices may include hardware components and software components. The services provided by the computing devices may be limited by these components.

SUMMARY

In general, in one aspect, the invention relates to a method for managing information handling systems. The method includes obtaining, by a stackable system role (SSR) manager of an information handling system, an SSR instruction, performing an encoding on the SSR instruction using a public key to obtain an encoded instruction value, providing an encoded SSR instruction to a local hardware resource manager of the information handling system, wherein the encoded SSR instruction comprises the SSR instruction and the encoded instruction value, obtaining, from the hardware resource manager, a response, wherein the response specifies whether the encoded SSR instruction is valid, and based on the response, initiating an execution of the SSR instruction.

In general, in one aspect, the invention relates to a non-transitory computer readable medium that includes computer readable program code, which when executed by a computer processor enables the computer processor to perform a method for managing information handling systems. The method includes obtaining, by a stackable system role (SSR) manager of an information handling system, an SSR instruction, performing an encoding on the SSR instruction using a public key to obtain an encoded instruction value, providing an encoded SSR instruction to a local hardware resource manager of the information handling system, wherein the encoded SSR instruction comprises the SSR instruction and the encoded instruction value, obtaining, from the hardware resource manager, a response, wherein the response specifies whether the encoded SSR instruction is valid, and based on the response, initiating an execution of the SSR instruction.

In general, in one aspect, the invention relates to an information handling system that includes a processor, and memory including instructions, which when executed by the processor, perform a method. The method includes obtaining, by a stackable system role (SSR) manager of the information handling system, an SSR instruction, performing an encoding on the SSR instruction using a public key to obtain an encoded instruction value, providing an encoded SSR instruction to a local hardware resource manager of the information handling system, wherein the encoded SSR instruction comprises the SSR instruction and the encoded instruction value, obtaining, from the hardware resource manager, a response, wherein the response specifies whether the encoded SSR instruction is valid, and based on the response, initiating an execution of the SSR instruction.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an information handling system environment in accordance with one or more embodiments of the invention.

FIG. 1.3 shows a second diagram of an information handling system environment in accordance with one or more embodiments of the invention.

FIG. 3.1 shows a diagram of a stackable system role entry in accordance with one or more embodiments of the invention.

FIG. 3.2 shows a diagram of an encoded SSR instruction in accordance with one or more embodiments of the invention.

FIG. 4.1 shows a flowchart of a method of initiating a stackable system role instruction in accordance with one or more embodiments of the invention.

FIG. 4.2 shows a flowchart of a method of servicing an encoded stackable system role instruction in accordance with one or more embodiments of the invention.

FIG. 4.3 shows a flowchart of a method of determining a stackable system role for an information handling system in accordance with one or more embodiments of the invention.

FIG. 4.4 shows a flowchart of a method of determining a set of stackable system roles for a set of information handling system in a committee in accordance with one or more embodiments of the invention.

FIG. 4.5 shows a flowchart of a method of determining a set of stackable system roles for a set of information handling system in multiple committees in accordance with one or more embodiments of the invention.

FIG. 4.6 shows a flowchart of a method of determining a set of stackable system roles for a set of information handling system in a zone in accordance with one or more embodiments of the invention.

FIGS. 5.1-5.4 shows a diagram of the operation of an example system over time in accordance with one or more embodiments of the invention.

DETAILED DESCRIPTION

Figure 2:
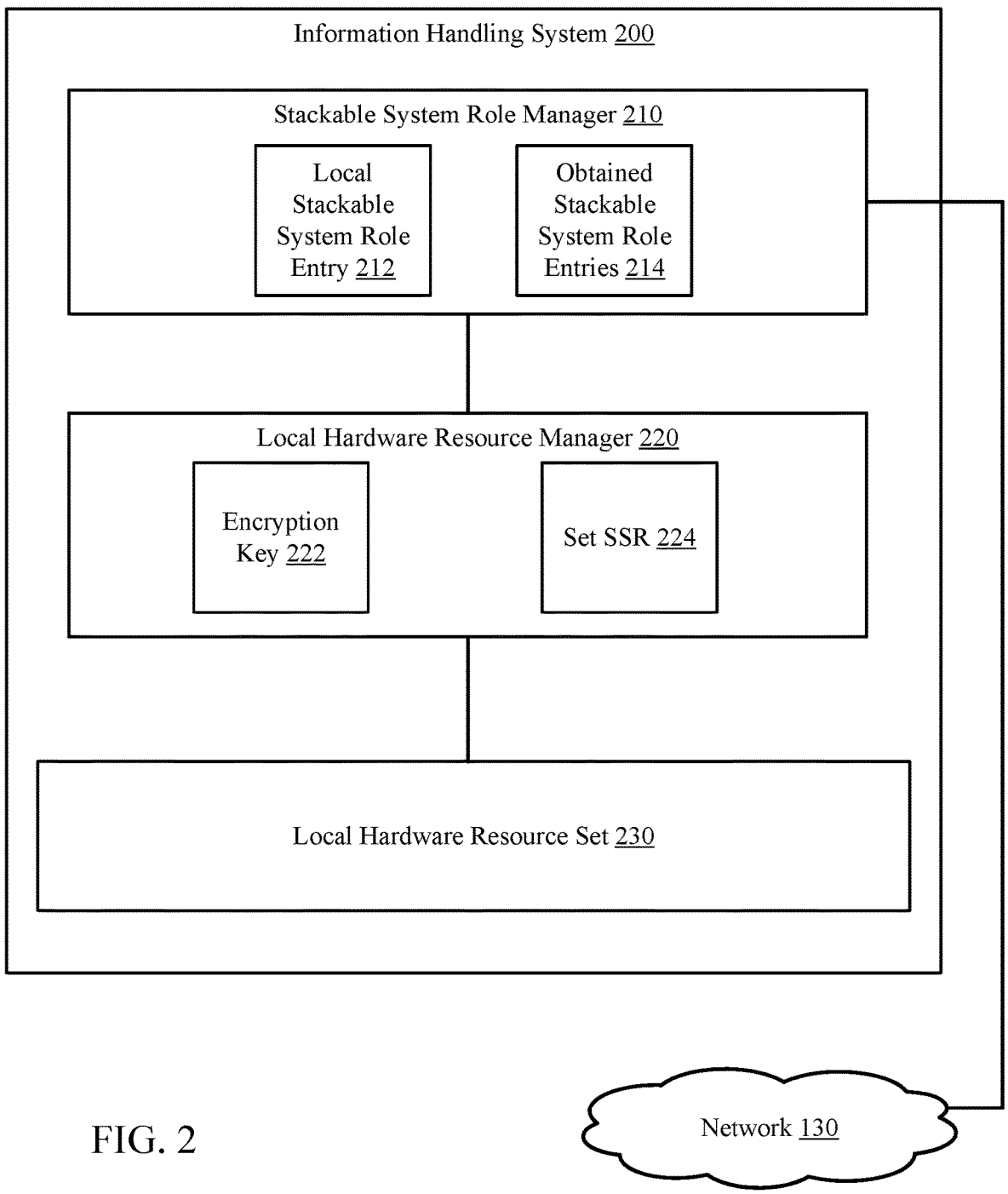
FIG. 2 shows a diagram of an information handling system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for managing information handling systems. Specifically, embodiments of the invention relate to a method for securely applying a setting to an information handling system. The setting may be a stackable system role (SSR). The application of a stackable system role may be performed using a public key provided to a SSR manager of the information handling system. The public key may be used to encrypt a SSR instruction to generate an encoded value. The SSR instruction and the encoded value (collectively an encoded SSR instruction) may be provided to a local hardware resource manager of the information handling system. The local hardware resource manager may utilize a private encryption key to determine whether the SSR instruction is valid and, if such determination is made, service the SSR instruction.

Embodiments of the invention may include, during a boot sequence performed by a set of information handling systems, determining a SSR for an information handling system, broadcasting the determined SSR to each information handling system in the boot sequence, and re-evaluating the determined SSR based on responses obtained from the other information handling system. The re-evaluated SSR may be re-broadcast to the information handling systems, and new responses may be obtained based on the re-broadcasted SSR. Iterations of the re-evaluation and re-broadcasting may be repeated until the responses and the most recent re-broadcasted SSR indicate an agreement between the information handling systems that all SSRs are determined for all information handling systems in the system.

Embodiments of the invention further include a method for enabling committee-leading information handling systems to obtain hardware resource information from multiple information handling systems in a committee and initially determining a first SSR for each information handling system in the committee. The committee-leading information handling system may send the determined SSRs to an information handling system leader (e.g., an information handling system with the role of determining the SSRs for each information handling system in multiple committees and initiating distribution of the determined SSRs to the information handling systems in the information handling system environment.

FIG. 1.1 shows a system in accordance with one or more embodiments of the invention. The system may include any number of information handling systems (62, 64) in an information handling environment (60). The information handling system environment (60) may provide computer implemented services. The computer implemented services may include, for example, database services, data storage services, electronic communications services, data protection services, and/or other types of services that may be implemented using information handling systems.

The information handling systems of FIG. 1.1 may operate independently and/or cooperatively to provide the computer implemented services. For example, a single information handling system (e.g., 62) may provide a computer implemented service on its own (i.e., independently) while multiple other information handling systems (e.g., 62, 64) may provide a second computer implemented service cooperatively (e.g., each of the multiple other information handling systems may provide similar and or different services that form the cooperatively provided service).

To provide computer implemented services, the information handling system environment (60) may utilize computing resources provided by hardware devices. The computing resources may include, for example, processing resources, storage resources, memory resources, graphics processing resources, communications resources, and/or other types of resources provided by the hardware devices. Various hardware devices may provide these computing resources.

The type and quantity of computing resources required to provide computer implemented services may vary depending on the type and quantity of computer implemented services to be provided. For example, some types of computer implemented services may be more compute intensive (e.g., modeling) while other computer implemented services may be more storage intensive (e.g., database) thereby having different computing resource requirements for these different services. Consequently, computing resources may be used inefficiently if the quantity of computing resources are over-allocated for the computer implemented services. Similarly, the quality of the provided computer implemented services may be poor or otherwise undesirable if computing resources are under-allocated for the computer implemented services.

In general, embodiments of the invention relate to systems, methods, and devices for managing the hardware resources of the information handling systems (62, 64) and/or other resources to provide computer implemented services. The hardware resources of the information handling systems (62, 64) may be managed by applying (or otherwise setting) a stackable system role to an information handling system (62, 64) managing the hardware resources. In one or more embodiments of the invention, a stackable system role is a dynamic role applied to an information handling system (62, 64) that is used to specify a functionality, an intended use, and/or an operational capability of the information handling system (62, 64). For example, the SSR may be used to determine a set of computer implemented services best suited to be provided by a corresponding information handling system based on a deployment of the information handling system and other information handling systems in the information handling system environment (60). For additional details regarding the stackable system roles (SSRs), see, e.g., FIG. 3.1.

In one or more embodiments of the invention, the application of SSRs to each information handling system (e.g., 62, 64) in the information handling system environment (60) may be based on the implementation of the information handling system environment (60). For example, the information handling system environment (60) may include information handling systems (e.g., 62, 64) that independently determine their respective SSRs and influence their determination based on the determination of other information handling systems of their respective SSRs. In such embodiments, the process of self-determining a SSR and enabling influence of such determination from other information handling systems may be performed using, for example, the method of FIG. 4.3.

As a second example, the information handling system environment (60) may include leading information handling systems that are designated to determine SSRs for other information handling systems in a subset (e.g., a committee) of information handling systems. The determined SSRs may be provided to an information handling system leader that determines final SSRs for information handling systems in the entire information handling system environment (60). For additional details regarding such embodiment, see, e.g., FIG. 1.2.

As a third example, the information handling system environment (60) may include leading information handling systems that are designated to determine SSRs for other information handling systems in a subset (e.g., a zone) of information handling systems. The determined SSRs may be distributed to each information handling system in the respective zone by the leading information handling system of such zone. For additional details regarding such embodiment, see, e.g., FIG. 1.3.

The system of FIG. 1.1 may include any number of information handling systems (e.g., 62, 64), the clients (e.g., 32, 34), and any number of administrators (e.g., 50). Any of the components of FIG. 1.1 may be operably connected to any other component and/or other components not illustrated in FIG. 1.1 via one or more networks (e.g., 130). The networks may be implemented using any combination of wired and/or wireless network topologies.

The administrators (50), information handling system environment (60), and/or clients (30) may be implemented using computing devices. The computing devices may include, for example, a server, laptop computer, a desktop computer, a node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the administrators (50), information handling system environment (60), and/or clients (30) described in this application and/or all, or a portion, of the methods illustrated in FIGS. 4.1-4.6. The administrators (50), information handling system environment (60), and/or clients (30) may be implemented using other types of computing devices without departing from the invention. For additional details regarding computing devices, refer to FIG. 6.

While the system of FIG. 1.1 has been illustrated and described as including a limited number of specific components, a system in accordance with embodiments of the invention may include additional, fewer, and/or different components without departing from the invention.

FIG. 1.2 shows a diagram of an information handling system environment in accordance with one or more embodiments of the invention. The information handling system environment (60A) illustrated in FIG. 1.2 may be an embodiment of the information handling system (60) discussed in FIG. 1.1. Turning to FIG. 1.2, the information handling system environment (60A) includes an information handling system (IHS) leader (72) and a set of one or more IHS committees (70A, 70N). Each IHS committee (70A, 70N) includes a committee leading IHS (74, 84) and additional IHSs (76A, 76N, 86A, 86N). The information handling system environment (60A) may include additional, fewer, and/or different components without departing from the invention.

In one or more embodiments of the invention, the IHS leader (72) is an IHS that determines the SSRs for all IHSs (e.g., 72, 74, 84, 76A, 76N, 86A, 86N) in the IHS environment (60A). The IHS leader may perform such determinations by performing, for example, the method of FIG. 4.5.

In one or more embodiments of the invention, the committee-leading IHSs (74, 84) are IHSs that perform an initial determination of SSRs in the IHSs in their respective committees. The determined SSRs may be provided to the IHS leader (72) for final determinations. The committee-leading IHSs may perform the initial determinations in accordance with, for example, the method of FIG. 4.4.

FIG. 1.3 shows a second diagram of an information handling system environment in accordance with one or more embodiments of the invention. The information handling system environment (60B) illustrated in FIG. 1.3 may be an embodiment of the information handling system (60) discussed in FIG. 1.1. Turning to FIG. 1.3, the information handling system environment (60B) includes a set of one or more IHS zones (90A, 90N). Each IHS committee (90A, 90N) includes a zone leading IHS (92, 112) and additional IHSs (96A, 96N, 116A, 116N). The information handling system environment (60A) may include additional, fewer, and/or different components without departing from the invention.

In one or more embodiments of the invention, the zone-leading IHSs (92, 112) are IHSs that perform determination of SSRs in the IHSs in their respective committees based on information obtained from the IHSs in their respective IHS zones (90A, 90N). The determined SSRs may be distributed to the IHSs (96A, 96N, 116A, 116N). The committee-leading IHSs may perform the initial determinations in accordance with, for example, the method of FIG. 4.6.

Turning to FIG. 2, FIG. 2 shows a diagram of an information handling system (200) in accordance with one or more embodiments of the invention. Any of the information handling systems (e.g., 62, 64, FIG. 1.1, 72, 74, 76A, 76N, 86A, 86N, 92, 112, 116A 116N) of FIGS. 1.1-1.3 may be similar to the information handling system (200) illustrated in FIG. 2.

As discussed above, the information handling system (200) may provide any quantity and type of computer implemented services. To provide computer implemented services, the information handling system (200) may include a stackable system role manager (210), a local hardware resource manager (220), and any number of hardware resources in a hardware resource set (230).

The stackable system role manager (210) of the information handling system (200) may facilitate determining the SSR of the information handling system (200). To facilitate such determinations, the stackable system role manager (210) may utilize a local stackable system role entry (212).

In one or more embodiments of the invention, the local stackable system role entry (212) is an updatable data structure generated by the information handling system (200). The local stackable system role entry (212) may specify a stackable system role (further discussed in FIG. 3.1) to be applied to the information handling system (200). The local stackable system role entry (212) may further specify an uncertainty for the stackable system role. In one or more embodiments of the invention, the uncertainty of a stackable system role may be a value representing a confidence (or lack thereof) for the information handling system to be associated with the stackable system role.

In one or more embodiments of the invention, the determination of the stackable system role and the uncertainty of the stackable system role is based, at least in part, by obtained stackable system role entries (214). In one or more embodiments of the invention, the obtained stackable system role entries (214) are data structures obtained from other information handling systems in the information handling system environment. The other information handling systems may provide the obtained stackable system role entries to the information handling system (200) based on a boot sequence performed by the information handling system (200) and/or by the other information handling systems. In one or more embodiments of the invention, the boot sequence is performed in accordance with the method of FIG. 4.3. The boot sequence may be performed via other methods without departing from the invention. For additional details regarding a stackable system role entry (e.g., a local stackable system role entry (212) or an obtained stackable system role entry (214)), see FIG. 3.1.

In one or more embodiments of the invention, the local hardware resource manager (220) manages the use of local hardware resources of the local hardware resource set (230). Specifically, the local hardware resource manager (220) includes functionality for monitoring the access to the local hardware resources by external entities (e.g., clients, other information handling systems, and/or applications executing thereof). The local hardware resource manager (220) may manage the use of the local hardware resources during a deployment (e.g., as the information handling system (200) is applied to a stackable system role) the applied stackable system role (or set SSR (224)) is stored and easily accessible by the local hardware resource manager (220) to be used to determine how the hardware resources are to be used by the external entities.

For example, if the set SSR (224) specifies that the information handling system (200) is assigned a stackable system role of cloud storage device, then the local hardware resource manager (220) monitors the usage of the hardware resources in the local hardware resource set (230) to ensure that the local hardware resources are used, at least primarily, to perform the functionality of a cloud service device. Such functionality may include an emphasis on the storage devices and the network devices of the local hardware resource set (230) for storage and transfer of data with low latency.

In one or more embodiments of the invention, the local hardware resource manager (220) utilizes an encryption key (222) to determine whether a SSR instruction (further discussed in FIG. 3.2) is a valid instruction. The local hardware resource manager (220) may utilize the encryption key (222) in accordance with FIG. 4.2.

In one or more embodiments of the invention, the local hardware resource manager (220) includes functionality for preparing the hardware resources of the local hardware resource set (230) for presentation to the external entities.

The information handling system (200) may be implemented using computing devices. The computing devices may be, for example, a server, laptop computer, desktop computer, node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the information handling system (200) described in this application and/or all, or a portion, of the methods illustrated in FIGS. 4.1-4.6. The information handling system (200) may be implemented using other types of computing devices without departing from the invention. For additional details regarding computing devices, refer to FIG. 6.

While the information handling system (200) has been illustrated and described as including a limited number of specific components, an information handling system in accordance with embodiments of the invention may include additional, fewer, and/or different components without departing from the invention.

The local hardware resource set (230) may include any number and types of hardware devices that may provide any quantity and type of computing resources. For example, the local hardware resource set (230) may include storage devices, memory devices, and special purpose devices.

The storage devices may provide storage resources (e.g., persistent storage) in which applications hosted by an information handling system may store data including any type and quantity of information. The storage devices may include any type and quantity of devices for storing data. The devices may include, for example, hard disk drives, solid state drives, tape drives, etc. The storage devices may include other types of devices for providing storages resources without departing from the invention. For example, the storage devices may include controllers (e.g., redundant array of disk controllers), load balancers, and/or other types of devices.

The memory devices may provide memory resources (e.g., transitory and/or persistent storage) in which an information handling system may store data including any type and quantity of information. The memory devices may include any type and quantity of devices for storing data. The devices may include, for example, transitory memory such as random access memory, persistent memory such as enterprise class memory, etc. The memory devices may include other types of devices for providing memory resources without departing from the invention. For example, the storage devices may include controllers (e.g., replication managers), load balancers, and/or other types of devices.

The special purpose devices may provide other types of computing resources (e.g., graphics processing resources, computation acceleration resources, etc.) to information handling systems. The special purpose devices may include any type and quantity of devices for providing other types of computing resources. The special purpose devices may include, for example, graphics processing units for providing graphics processing resources, compute accelerators for accelerating corresponding workloads performed by information handling systems, application specific integrated circuits (ASICs) for performing other functionalities, digital signal processors for facilitating high speed communications, field-programmable gate arrays (FPGAs), etc. The special purpose devices may include other types of devices for providing other types of computing resources without departing from the invention.

While the local hardware resource set (230) has been illustrated and described as including a limited number of specific components, hardware resources in accordance with embodiments of the invention may include additional, fewer, and/or different components without departing from the invention.

As discussed above, an information handling system may utilize stackable system role entries to be determined by the information handling system and/or broadcasted to other information handling systems. FIG. 3.1 shows a diagram of a SSR entry (310) in accordance with one or more embodiments of the invention. The SSR entry (310) may be an embodiment of a local SSR entry (212, FIG. 2) or an obtained SSR entry (214, FIG. 2) discussed above. The SSR entry (310) illustrated in FIG. 3 may include a stackable system role (312), a SSR uncertainty field (314), and vendor certification information (316). The SSR entry (310) may include additional, fewer, and/or different portions without departing from the invention.

In one or more embodiments of the invention, the SSR (312) specifies a role of the SSR entry (310). As discussed above, a SSR is a role to be applied to an information handling system that specifies a functionality, an intended use, and/or an operational capability of the information handling system. The SSR may further be determined relative to the information handling system environment. Said another way, the SSR may be determined based on the needs of an information handling system environment in which the information handling system is operating.

For example, consider a scenario in which an information handling environment operates to provide cloud-based services. IHS A and IHS B may both include the appropriate hardware resources to be considered a SSR of cloud storage device. However, IHS A may further include the appropriate hardware resource to be an edge device. The information handling system environment may require the use of both a cloud storage device and an edge device. Based on these requirements, IHS A may determine that its stackable system role is that of an edge device, and IHS B may determine that its stackable system role is that of a cloud storage device.

In one or more embodiments of the invention, the SSR (312) is implemented as a four-bit data item. Each bit in a four-bit data item may correspond to a general functionality setting. The setting of each bit (e.g., 0 or 1) may correspond to whether it is determined that an IHS of the SSR entry (310) is to be associated with the general functionality. Examples of general functionalities include, but are not limited to: worker functionality, storage functionality, manage functionality, and external access functionality. The worker functionality may correspond to an intended use of an IHS to execute heavy computations. A bit in the four-bit data item may correspond to a worker setting. The storage functionality may correspond to an intended use of an IHS to store large amounts of data. A bit in the four-bit data item may correspond to a storage setting. The manage functionality may correspond to an intended use to manage multiple entities (e.g., other IHSs) in the IHS environment. A bit in the four-bit data item may correspond to a manage setting. The external access functionality corresponds to an intended use for the IHS to transfer large amounts of data between IHSs. A bit in the four-bit data item may correspond to an external access setting. In such embodiments, the SSR (312) may be a combination of the four settings (e.g., the worker setting, the storage setting, the manage setting, and the external access setting).

In one or more embodiments of the invention, the SSR uncertainty field (314) is a data structure that specifies an uncertainty for the SSR (312). The SSR uncertainty field (314) may specify a confidence (or lack thereof) that the SSR (312) is to be applied to the IHS.

The SSR uncertainty field (314) may be implemented as a series of bits that correspond to an uncertainty for each general functionality setting as discussed above. For example, in such embodiments in which the SSR (312) is a four-bit data item, the SSR uncertainty field (314) may correspond to two bits for each of the four general functionalities. In such embodiments, the SSR uncertainty field (314) may correspond to an eight-bit data item.

In one or more embodiments of the invention, the vendor certification information (316) is a data structure that specifies certification by the vendor of the IHS to the client. The vendor certification information (316) may be used to certify a client that the hardware, software, and/or firmware settings of the components in the IHS meet the expectations of the clients. The vendor certification information (316) may be information intended to only be generated by a vendor of the IHS (or a source trusted by the vendor and/or the client utilizing the IHS).

As an IHS determines a SSR (312) in a SSR entry is to be applied to an IHS, the SSR manager of such IHS may perform the method of FIG. 4.1 to generate an encoded SSR instruction. FIG. 3.2 shows a diagram of an encoded SSR instruction in accordance with one or more embodiments of the invention. The encoded SSR instruction (320) may include a SSR instruction (322), a SSR entry (310), and an encoded instruction value (326). The SSR entry (310) may include at least a portion of the SSR entry (310) discussed above.

In one or more embodiments of the invention, the SSR instruction (322) is a data structure that specifies an instruction to be executed by a local hardware resource manager of an IHS corresponding to an SSR of the IHS. The SSR instruction may specify reading an existing applied SSR of the IHS, writing a SSR specified in the SSR entry (310) to the IHS, and/or resetting the SSR of the IHS to no SSR. The SSR instruction (322) may specify other instructions without departing from the invention.

In one or more embodiments of the invention, the encoded instruction value (326) is a data structure that is used for verification purposes. The encoded instruction value (326) may be generated by encoding at least a portion of the SSR instruction and/or the SSR entry (310) using an encryption key. The encryption key may be an encryption key obtained from the local hardware resource manager. The encoded instruction value may be encoded using any other mechanism without departing from the invention.

FIG. 4.1 shows a flowchart of a method in accordance with one or more embodiments of the invention. The method depicted in FIG. 4.1 may be performed to initiate a stackable system role instruction in accordance with one or more embodiments of the invention. The method shown in FIG. 4.1 may be performed by, for example, a stackable system role manager (e.g., 210, FIG. 2). Other components of the system in FIG. 2 may perform all, or a portion, of the method of FIG. 4.1 without departing from the invention.

While FIG. 4.1 is illustrated as a series of steps, any of the steps may be omitted, performed in a different order, additional steps may be included, and/or any or all of the steps may be performed in a parallel and/or partially overlapping manner without departing from the invention.

In step 400, the SSR manager obtains a SSR instruction. In one or more embodiments of the invention, the SSR instruction is obtained in response to a determination to instruct the IHS to read a currently applied SSR, to write a SSR, or to reset the currently applied SSR to null. Such determination may be performed by the SSR manager of the IHS. Alternatively, in one or more embodiments of the invention, the SSR instruction is obtained from an external entity (e.g., a second IHS or a client).

In step 402, an encoding is performed on the SSR instruction using a public key. In one or more embodiments of the invention, the public key is obtained from the local hardware resource manager. The encoding may be performed by performing an encoding algorithm on the SSR instruction (or a portion thereof) using the obtained public key on the obtained SSR instruction and the obtained SSR entry. The result of the encoding is an encoded instruction value. Collectively, the encoded SSR instruction includes the encoded instruction value, the SSR instruction, and the encoded instruction value.

In step 404, the encoded SSR instruction is provided to the local hardware resource manager of the information handling system.

In one or more embodiments of the invention, the encoded SSR instruction is processed via the method of FIG. 4.2 by the local data system manager. The encoded SSR instruction may be performed via any other method without departing from the invention.

In step 406, a response is obtained from the local hardware resource manager. In one or more embodiments of the invention, the response specifies whether the local hardware resource manager serviced the SSR instruction as requested by the local hardware resource manager. For example, if the SSR instruction specifies reading the SSR of the IHS entry, the response may specify the SSR instruction. As a second example, if the SSR instruction specifies resetting the SSR, the response may specify whether the SSR is reset. As a third example, if the SSR instruction specifies writing a SSR, the response may specify whether the SSR was applied as requested.

In step 408, a determination is made about whether the response indicates that the SSR instruction is serviced. If the SSR instruction is serviced, the method ends following step 408; otherwise, the method proceeds to step 410.

In step 410, following the determination that the SSR instruction is not serviced, a corrective action is performed. Examples of the corrective action includes, but are not limited to: regenerating and reencoding the SSR instruction, sending a request to the external entity to resend a valid SSR instruction, and/or simply resending the SSR instruction.

FIG. 4.2 shows a flowchart of a method in accordance with one or more embodiments of the invention. The method depicted in FIG. 4.2 may be performed to service an encoded SSR instruction in accordance with one or more embodiments of the invention. The method shown in FIG. 4.2 may be performed by, for example, a local hardware resource manager (e.g., 220, FIG. 2). Other components of the system in FIG. 2 may perform all, or a portion, of the method of FIG. 4.2 without departing from the invention.

While FIG. 4.2 is illustrated as a series of steps, any of the steps may be omitted, performed in a different order, additional steps may be included, and/or any or all of the steps may be performed in a parallel and/or partially overlapping manner without departing from the invention.

Turning to FIG. 4.2, in step 420, the local hardware resource manager obtains an encoded SSR instruction from a SSR manager. In one or more embodiments of the invention, the encoded SSR instruction is the encoded SSR instruction discussed in step 402 of FIG. 4.1.

In step 422, an encoding is performed on a portion of the encoded SSR instruction using an encryption key to obtain an encoded value. In one or more embodiments of the invention, the encoded SSR instruction includes an encoded instruction value and additional data (e.g., the SSR instruction and the SSR entry). The encoding may be performed on the additional data. The encoding may be similar to the encoding discussed in FIG. 4.2. The encryption key may be similar or different from the public key obtained by the SSR manager without departing from the invention.

In step 424, the encoded value is compared to an obtained encoded instruction value of the SSR instruction. In one or more embodiments of the invention, the encoded value generated in step 422 is compared to the obtained encoded instruction value by determining a similarity between the two values. If the two values are similar as expected (or identical as expected), the local hardware resource manager may determine that the obtained SSR instruction is valid. In such embodiments in which there is a discrepancy between the two values, the local hardware resource manager may determine that the SSR instruction is not valid.

In step 426, a determination about whether the comparison indicates that the SSR instruction is valid. If the SSR is determined to be valid; the method proceeds to step 428; otherwise, the method proceeds to step 432.

In step 428, following the determination that the SSR is indicated to be valid, the stackable system role instruction is serviced. In one or more embodiments of the invention, the servicing depends on the SSR instruction. For example, if the SSR instruction specifies reading the currently applied SSR, the local hardware resource manager accesses the set SSR of the IHS. As a second example, if the SSR instruction specifies to apply a SSR specified in the obtained SSR entry, the local hardware resource manager may replace the current SSR with the specified SSR. As a third example, if the SSR instruction specifies resetting the SSR, the local hardware resource manager removes the current SSR (if any) such that the IHS is no longer associated with a SSR.

In step 430, a response that indicates the SSR instruction is serviced is sent. The response may be sent to the SSR manager from which the encoded SSR instruction is obtained.

In step 432, following a determination that the SSR instruction is not valid, a response that indicates that indicates lack of service is sent. The response may be sent to the SSR manager from which the encoded SSR instruction is obtained.

FIG. 4.3 shows a flowchart of a method in accordance with one or more embodiments of the invention. The method depicted in FIG. 4.3 may be performed to determine a SSR for an IHS in accordance with one or more embodiments of the invention. The method shown in FIG. 4.3 may be performed by, for example, a stackable system role manager (e.g., 210, FIG. 2). Other components of the system in FIG. 2 may perform all, or a portion, of the method of FIG. 4.3 without departing from the invention.

While FIG. 4.3 is illustrated as a series of steps, any of the steps may be omitted, performed in a different order, additional steps may be included, and/or any or all of the steps may be performed in a parallel and/or partially overlapping manner without departing from the invention.

In step 440, a boot sequence is initiated. In one or more embodiments of the invention, the boot sequence may be initiated for a set of one or more IHSs in an IHS environment. During the boot sequence, the IHS may identify a set SSR (if any) of the IHS.

In step 442, a determination is made about whether the boot sequence specifies a stackable system role. If the boot sequence specifies a SSR, the method proceeds to step 454; otherwise, the method proceeds to step 444.

In step 444, a hardware evaluation is performed to determine a SSR for the IHS. In one or more embodiments of the invention, the hardware evaluation is a method of obtaining hardware resource information corresponding to the hardware resource set of the IHS, determining a capability of the IHS based on the hardware resource information, and determining a SSR based on such capability.

For example, an IHS may include several storage devices and include a high network bandwidth. Based on this hardware resource information, the SSR manager may determine a SSR of a cloud storage device, which is a role that is intended to be heavily used for storage and external access.

In one or more embodiments of the invention, an initial uncertainty field is generated for the SSR. As discussed above, the uncertainty field may be a value corresponding to an uncertainty of the SSR. The uncertainty field may be determined by further analyzing the hardware resource information to determine how capable the IHS is of performing a portion of the SSR.

For example, if the IHS includes more than one central processing units (CPUs), but the IHS has not used the multiple CPUs all at one time, the uncertainty of the SSR having the worker setting to 1 may be fair to high. In other words, the worker setting (which is a setting that requires use of a high amount of processing) of 1 set in the SSR may correspond to a higher than low uncertainty (e.g., a fair or a high uncertainty).

In step 446, a SSR entry is broadcast to additional IHSs in the IHS environment. In one or more embodiments of the invention, the SSR entry that is broadcast is the most recent SSR entry generated (and/or most recently updated) by the SSR manager. The SSR entry may be that generated in step 444 or the most recently updated SSR entry of step 450 (discussed below).

In step 448, SSR responses are obtained from the additional IHSs in the IHS environment. In one or more embodiments of the invention, each IHS sends a response to the SSR manager based on the broadcasted SSR entry. The responses may be obtained SSR entries each corresponding to the SSR of one of the additional IHSs. The additional IHSs may perform their own methods (e.g., similar, at least, to that of FIG. 4.3) to determine their own respective SSR entries to be broadcasted as a response to the broadcasted SSR entry of step 444. Each obtained SSR entry of an IHS may specify, at least, a SSR of such IHS (as determined by such IHS) and an uncertainty field of the SSR.

In step 450, a SSR entry analysis is performed based on the obtained SSR responses to update the local SSR entry. In one or more embodiments of the invention, the SSR entry analysis includes analyzing each obtained SSR entry to determine how the SSR entry of the IHS is to be updated. Specifically, the SSR entry analysis may include selecting an obtained SSR entry, comparing the obtained SSR of the selected SSR to the SSR of the IHS, determining whether there is a conflict between the two SSRs, and, if there is a conflict, using the uncertainty fields to resolve such conflict.

For example, consider a scenario in which an obtained SSR entry specifies that a second IHS believes to be highly certain that it is a worker and highly certain that it is not a storage device, a manager device, or an external access device. The IHS performing the method of FIG. 4.3 is uncertain whether it is a worker, highly certain it is not a storage device, fairly certain it is a manage device, and highly certain it is not an external access device. The IHS environment may demand for the use of worker devices and manage devices. Because of the two IHSs, only the second IHS (e.g., the IHS of FIG. 4.3) believes to have any certainty to be a manage device, the second IHS may update its SSR entry to be more certain that it is a manage device (e.g., update the uncertainty field for the manage setting from fairly certain to highly certain).

In one or more embodiments of the invention, if, during the updating of the SSR entry, a high enough level of uncertainty is reached for one of the settings in the SSR, the setting may be switched. For example, if the IHS becomes highly uncertain of its setting that it is not a manage device, then the SSR may be updated from specifying it is not a manage device to specifying that it is a manage device. In other words, an indication of a high enough level of uncertainty for a setting may be replaced with a high level of certainty of the opposite setting.

To clarify, in one or more embodiments of the invention, the IHS performing the method of FIG. 4.3 does not update any of the obtained SSR entries. Such action may result in determining the SSR of other IHSs. The purpose of FIG. 4.3 is to determine and/or update the SSR of the IHS performing the method based on determined SSRs of other IHSs in the IHS environment.

In step 452, a determination is made about whether the SSR responses indicate an agreement of the SSRs in the system is established. In one or more embodiments of the invention, the agreement is established when: (i) all responses (e.g., all obtained SSR entries) indicate a high enough level of certainty (or low enough level of uncertainty) for their respective SSR, and (ii) the updated SSR of step 450 indicates a high enough level of certainty (or low enough level of uncertainty) for its respective SSR. If an agreement is made, the method proceeds to step 454; otherwise, the method proceeds to step 446. In other words, if an agreement is not established, the updated SSR entry of step 450 is rebroadcast in accordance with step 446.

In step 454, the boot sequence continues based on a SSR of the IHS. In one or more embodiments of the invention, the SSR is the SSR specified in the boot sequence as determined in step 442. Alternatively, the SSR is the SSR specified in the local SSR entry as updated in step 450.

FIG. 4.4 shows a flowchart of a method in accordance with one or more embodiments of the invention. The method depicted in FIG. 4.4 may be performed to determine a set of stackable system roles for a set of information handling system in a committee in accordance with one or more embodiments of the invention. The method shown in FIG. 4.4 may be performed by, for example, a committee-leading IHS (e.g., 74, 84, FIG. 1.2). Other components of the system in FIG. 1.2 may perform all, or a portion, of the method of FIG. 4.4 without departing from the invention.

While FIG. 4.4 is illustrated as a series of steps, any of the steps may be omitted, performed in a different order, additional steps may be included, and/or any or all of the steps may be performed in a parallel and/or partially overlapping manner without departing from the invention.

In step 460, a set of hardware resource information is obtained from a set of IHSs in a committee of the committee-leading IHS. In one or more embodiments of the invention, the hardware resource information of an IHS is information corresponding to the hardware resources of the IHS. The hardware resource information may specify, for example, the hardware resources included in the IHS, the capability of each hardware resource, the connectivity between the hardware resources in the IHS, and/or any other information without departing from the invention.

In step 462, a SSR entry analysis is performed based on the obtained SSR entries. In one or more embodiments of the invention, the SSR entry analysis is a process for analyzing the collective obtained hardware resource information of the IHSs in the committee. The SSR analysis may result in a mapping of the capabilities of each of the IHSs in the IHS committee.

In step 464, a SSR is determined for each IHS in the set. In one or more embodiments of the invention, the SSRs are determined using the mapping of the capability obtained from the SSR entry analysis. The SSRs are determined by identifying the needs of the IHS environment as determined by, e.g., a client utilizing the IHS environment, identifying the required SSRs based on the identified needs, and assigning a SSR to each IHS based on the mapping of the capabilities.

In step 466, the determined SSRs are provided to an IHS leader. The IHS leader may be an IHS external to the committee.

FIG. 4.5 shows a flowchart of a method in accordance with one or more embodiments of the invention. The method depicted in FIG. 4.5 may be performed to determine a set of stackable system roles for a set of information handling system in a committee in accordance with one or more embodiments of the invention. The method shown in FIG. 4.5 may be performed by, for example, an IHS leader (e.g., 72, FIG. 1.2). Other components of the system in FIG. 1.2 may perform all, or a portion, of the method of FIG. 4.4 without departing from the invention.

While FIG. 4.5 is illustrated as a series of steps, any of the steps may be omitted, performed in a different order, additional steps may be included, and/or any or all of the steps may be performed in a parallel and/or partially overlapping manner without departing from the invention.

In step 480, the IHS leader obtains a set of determined SSRs from one or more committees. The set of determined SSRs may be the determined SSRs sent by the committee leading IHS in step 466. Additionally, other determined SSRs may be obtained for additional committees. The sets of determined SSRs for the one or more committees may collectively be included in the obtained SSRs processed in the remaining of the method of FIG. 4.5.

In step 482, an SSR analysis is performed based on the obtained SSRs. In one or more embodiments of the invention, the SSR analysis is a method for comparing each obtained determined SSR (including the uncertainty fields of the corresponding SSRs) to determine whether the determined SSRs are to be kept as obtained or whether a modification is to be performed. Because the obtained SSR entries are determined based on the IHSs in their respective committees, the IHS leader may use the collective obtained SSR entries to update, if necessary, the determined SSRs. Further, the needs of the IHS environment are taken into account when determining the SSRs for the IHSs.

In one or more embodiments, if any conflicts in SSRs are identified between IHSs of multiple committees, the SSR entry analysis includes identifying such conflicts. For example, consider a scenario in which an IHS environment consisting of two committees requires the use of one IHS with an assigned SSR that is an edge device. In such example, each committee leading IHS may determine an IHS in each respective committee to be an edge device. The IHS leader obtaining the determined SSRs for two IHSs determined to be an edge device may be identified as a conflict, since only one edge device is required in the IHS environment.

In step 484, a SSR is determined for each information handling system in the one or more committees. In one or more embodiments of the invention, the SSRs are determined based on the SSR entry analysis discussed in step 482. The SSRs may be determined using the identified needs of the IHS environment and while resolving any issues identified in step 482. In one or more embodiments of the invention, the identified conflicts may be resolved using the SSR uncertainty fields of the SSRs.

In step 486, an SSR distribution is initiated based on the determined SSRs. In one or more embodiments of the invention, the SSR distribution is a method for distributing the determined SSRs to each corresponding IHS by the IHS leader. The IHS leader may initiate the SSR distribution by distributing the SSRs as SSR entries to each IHS directly using the network connecting the IHSs to the IHS leader. Alternatively, the IHS leader may distribute the determined SSRs to the respective committee-leading IHSs and request distribution of the IHSs down to the corresponding IHSs in the committees. The SSR distribution may be initiated via other methods without departing from the invention.

FIG. 4.6 shows a flowchart of a method in accordance with one or more embodiments of the invention. The method depicted in FIG. 4.6 may be performed to determine a set of stackable system roles for a set of information handling system in a committee in accordance with one or more embodiments of the invention. The method shown in FIG. 4.4 may be performed by, for example, a zone-leading IHS (e.g., 92, 112, FIG. 1.3). Other components of the system in FIG. 1.3 may perform all, or a portion, of the method of FIG. 4.6 without departing from the invention.

While FIG. 4.6 is illustrated as a series of steps, any of the steps may be omitted, performed in a different order, additional steps may be included, and/or any or all of the steps may be performed in a parallel and/or partially overlapping manner without departing from the invention.

In step 490, a set of hardware resource information is obtained from a set of IHSs in a zone of the zone-leading IHS. In one or more embodiments of the invention, the hardware resource information of an IHS is information corresponding to the hardware resources of the IHS. The hardware resource information may specify, for example, the hardware resources included in the IHS, the capability of each hardware resource, the connectivity between the hardware resources in the IHS, and/or any other information without departing from the invention.

In step 492, a SSR entry analysis is performed based on the obtained hardware resource information. In one or more embodiments of the invention, the SSR entry analysis is a process for analyzing the collective obtained hardware resource information of the IHSs in the committee. The SSR analysis may result in a mapping of the capabilities of each of the IHSs in the IHS committee.

In step 494, a SSR is determined for each IHS in the zone. In one or more embodiments of the invention, the SSRs are determined using the mapping of the capability obtained from the SSR entry analysis. The SSRs are determined by identifying the needs of the IHS environment as determined by, e.g., a client utilizing the IHS environment, identifying the required SSRs based on the identified needs, and assigning a SSR to each IHS based on the mapping of the capabilities.

In step 496, an SSR distribution is initiated based on the determined SSRs. In one or more embodiments of the invention, the SSR distribution is a method for distributing the determined SSRs to each corresponding IHS in the zone. The zone-leading IHS may initiate the SSR distribution by distributing the SSRs as SSR entries to each IHS in the zone directly using the network connecting the IHSs to the IHS leader. The SSR distribution may be initiated via other methods without departing from the invention.

To further clarify embodiments of the invention, four non-limiting examples are provided in FIGS. 5.1-5.4. The four examples may be independent of each other. FIGS. 5.1-5.4 each show a system similar to that illustrated in FIG. 1.1. Actions performed by components of the system are illustrated by numbered, circular boxes interconnected, in part, using dashed lines terminating in arrows. For the sake of brevity, only a limited number of components of the system of FIGS. 1.1-2 is illustrated in FIGS. 5.1-5.4.

Example 1

Consider a scenario in which two IHSs are to securely apply a SSR to each respective IHS. FIG. 5.1 includes a diagram of SSR entries each corresponding to an IHS. For the sake of brevity, the IHSs are not illustrated. SSR role entry A (500A) is a first SSR entry corresponding to a first IHS. SSR entry A (500A) includes a first SSR (502A) and a SSR uncertainty field (504A). Each SSR is determined by four settings: a worker setting determined by a worker bit, a storage setting determined by a storage bit, a manage setting determined by a manage bit, and an external access setting determined by an external access bit.

SSR A (502A) specifies that the IHS is determined to be a storage controller. Specifically, SSR A (502A) specifies that IHS A is set with a storage bit and a manager bit to 1, indicating that IHS A is capable of being a storage device and a manager device. Such combination results in the determination that the SSR is a storage controller. A storage controller may include functionality of storing large amounts of data and manage other storage devices.

The SSR entry (500A) further includes a SSR uncertainty field (504A). The uncertainty field is implemented as an eight-bit data item. The first two bits indicate an uncertainty of the worker bit, the next two bits indicate an uncertainty of the storage bit, the following two bits indicate an uncertainty of the manager bit, and the last two bits indicate an uncertainty of the external access bit. An uncertainty of 00 indicates a low uncertainty (e.g., a high certainty), an uncertainty of 01 indicates a fair uncertainty, an uncertainty of 10 indicates a high uncertainty, and an uncertainty of 11 is a very high uncertainty, which would be replaced with a low uncertainty of the opposite setting.

A SSR manager of IHS A performs the method of FIGS. 4.1-4.2 to encode the SSR entry (500A) using a public key to obtain a first encoded instruction value. The SSR manager further provides the SSR entry, a SSR instruction that specifies writing (also referred to as applying) the SSR (502A), and the encoded instruction value to a local hardware resource manager of IHS A. The local hardware resource manager performs the method of FIG. 4.2 to verify and service the SSR instruction. The result of the servicing is applying the SSR (502A) of storage controller to IHS A.

Similar to IHS A, IHS B (not shown in FIG. 5.1) includes a SSR entry (500B) that includes SSR A (502B) and a SSR uncertainty field (504B). SSR B (502B) specifies that IHS B is determined to be a cloud storage device. Specifically, SSR B (502B) specifies that IHS B is set with a storage bit and an external access bit to 1, indicating that IHS B is capable of being a storage device and an external access device. Such combination results in the determination that the SSR is to be a cloud storage device. A cloud storage device may include functionality for storing and transferring large amounts of data.

Further similar to IHS A, a SSR manager of IHS B performs the method of FIGS. 4.1-4.2 to apply the SSR (502B) to IHS B, thus making IHS B a cloud storage device.

End of Example 1

Example 2

Consider a scenario in which an IHS is determining its SSR using other IHSs in the IHS environment. FIG. 5.2 shows a diagram of an IHS environment. The IHS environment includes three IHSs (IHS A (510), IHS B (520), IHS C (530)). IHS A (510) performs the method of FIG. 4.3 and analyzes the hardware resource set (518) [1]. The hardware resource set (518) is accessed, and any information regarding the hardware resource set (518) is provided to the SSR manager (514) [2]. While not shown in FIG. 5.2, the hardware resource set (518) includes storage devices and a large number of central processing units (CPUs). Based on the obtained information, the SSR manager (514) generates a first SSR entry (512A) that specifies a SSR of a worker setting of 1 with a low uncertainty and a storage setting of 1 with a fair uncertainty [3]. The generated SSR entry A (512A) is broadcast to IHS B (520) and IHS C (530) [4].

The IHSs (520, 530), in response to obtaining the SSR entry (512A), each evaluate their own hardware resources (not shown) and generate their own SSR entries (not shown). The generated SSR entries are provided to IHS A (510) [5]. The SSR entries indicate IHS B (520) as being a storage device with low uncertainty and IHS C (530) being a manage device with low uncertainty. Based on these responses, the SSR manager (514) of IHS A (510) updates the SSR entry to generate SSR entry B (512B). SSR entry B (512B) is updated to replace the storage setting to 0 and to replace the uncertainty of the storage setting to highly certain it is not a storage device [6]. The SSR manager (510) performs an encoding of an SSR instruction using SSR entry B (512B) using the method of FIG. 4.1 and provides an encoded SSR instruction to a local hardware resource manager (516) [7]. The local hardware resource manager (516) performs the method of FIG. 4.2 to verify the encoded SSR instruction and service it by applying the SSR to IHS A (510) [8].

End of Example 2

Example 3

Consider a scenario in which a set of IHSs in an IHS environment are to determine SSRs for the IHSs. FIG. 5.3 shows a diagram of an IHS environment. The IHS environment includes two committees, committee A and committee B. Committee A includes a committee leading IHS (552) and two other IHSs (554A, 554B). Committee B includes a second committee leading IHS (556) and two additional IHSs (558C, 558D). The IHS environment may require the use of storage devices, two storage controller devices, and an edge device.

Each information handling system (554A, 554B, 558C, 558D) obtains hardware resource information based on its associated hardware resource sets. The IHSs (554A, 554B, 558C, 558D) provide the corresponding hardware resource information to the associated committee leading IHS. Specifically, IHS A (554A) and IHS B (554B) send their hardware resource information to committee A leading IHS (552), and IHS C (558C) and IHS D (558D) send their hardware resource information to committee B leading IHS (556) [9].

Each committee leading IHS (552, 556) utilize the obtained hardware resource information to determine SSRs for each IHS [10]. Specifically, committee A leading IHS (552) determines, based on the obtained hardware resource information from IHS A (554A) and IHS B (554B), that IHS A is a storage device, IHS B is an edge device, and committee A leading IHS (552) is a storage controller device [10]. Turning to committee B, committee B leading IHS (556) use the obtained hardware resource information of IHS C (558C) and IHS D (558D) to determine that IHS C (558C) is a storage device, IHS D (558D) is a storage controller, and committee B leading IHS (556) is an edge device. The determined SSRs by each committee leading IHS (552, 556) are provided to an IHS leader (550).

The IHS leader (550) obtains the determined SSRs and re-determines the SSRs for each IHS (552, 554A, 554B, 556, 558C, 558D) [11]. Specifically, the IHS leader (550) collectively analyzes the determinations that both IHS B (554B) and committee B leading (556) are determined as edge devices, though the IHS environment only demands one edge device. Based on this fact, IHS leader analyzes the uncertainty fields of each SSR for IHS B (554B) and committee B leading IHS (556) to assign the SSR of edge device to committee B leading IHS (556) due to a lower uncertainty of the IHS (556). IHS B (554B) is assigned the SSR of storage device.

IHS leader (550) self-determines a SSR of storage controller. Because both committee A leading IHS (552) and IHS D (558D) are both also determined to be storage controllers, IHS leader (550) analyzes the uncertainty fields to determine that IHS leader (550) and committee A leading IHS (552) are to be storage controllers, and IHS D (558D) is to be a storage device.

The re-determined SSRs are distributed to each IHS (552, 554A, 554B, 556, 558C, 558D) in the IHS environment. Each respective IHS (552, 554A, 554B, 556, 558C, 558D) may apply the SSR in accordance with FIGS. 4.1 and 4.2.

End of Example 3

Example 4

Consider a scenario in which a set of IHSs in an IHS environment are to determine SSRs for the IHSs. FIG. 5.4 shows a diagram of an IHS environment. The IHS environment includes two zones, zone A and zone B. Zone A includes a zone leading IHS (562) and three other IHSs (564A, 564B, 564C). Zone B includes a second zone leading IHS (566) and two additional IHSs (568D, 568E). Each zone in the IHS environment may require the use of SSRs consisting of cloud storage devices and a login device. A cloud storage device may be an IHS that includes capability for both storage and external access. A login device is an IHS that includes capability for both manage and external access.

Turning to FIG. 5.4, each information handling system (564A, 564B, 564C) of zone A obtains hardware resource information based on its associated hardware resource sets. The IHSs (564A, 564B, 564C) of zone A provide the corresponding hardware resource information to zone A leading IHS (562) [13]. Zone A leading IHS (562), using the obtained hardware resource information and its own hardware resource information, determines an SSR for each IHS in zone A [14]. Specifically, zone A leading IHS (562) determines that IHS A (564A) is capable of external access and managing, and assigns the SSR of login device to IHS A (564A). The remaining IHSs (562, 564B, 564C) are assigned the role of cloud storage devices. Zone A leading IHS (562) initiates distribution of the determined SSRs to each IHS (564A, 564B, 564C) in zone A [15].

Similar to zone A, each information handling system (568D, 568E) of zone B obtains hardware resource information based on its associated hardware resource sets. The IHSs (568D, 568E) of zone B provide the corresponding hardware resource information to zone B leading IHS (566) [16]. Zone B leading IHS (566), using the obtained hardware resource information and its own hardware resource information, determines an SSR for each IHS in zone B [17]. Specifically, zone A leading IHS (566) determines that IHS E (568E) is capable of external access and managing, and assigns the SSR of login device to IHS E (568E). The remaining IHSs (566, 568D) are assigned the role of cloud storage devices. Zone B leading IHS (566) initiates distribution of the determined SSRs to each IHS (568D, 568E) in zone B [18]. The assignments of the SSRs in zone A and the assignments of the SSRs in zone B are independent of each other in this example.

End of Example 4

Figure 6:
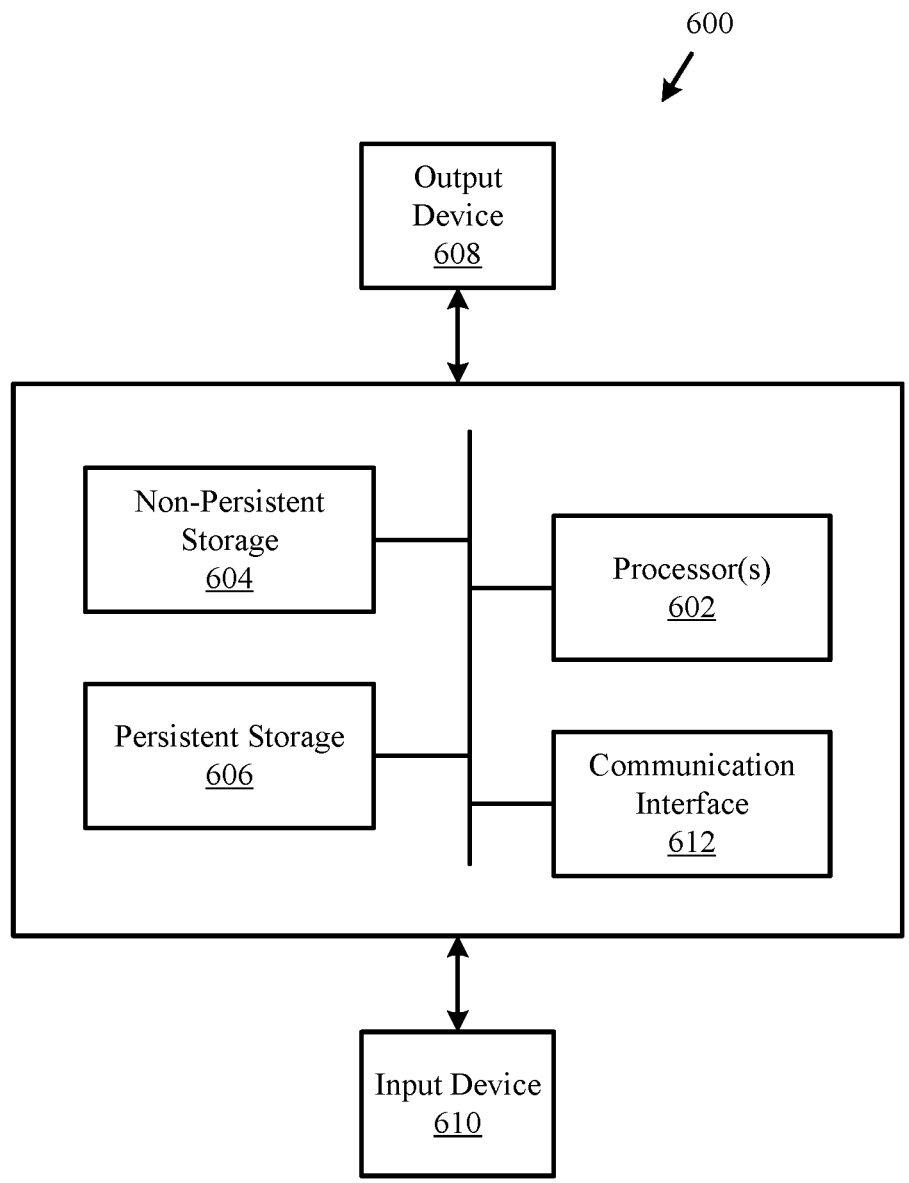
FIG. 6 shows a diagram of a computing device in accordance with one or more embodiments of the invention.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

Embodiments of the invention may provide a system and method for managing the use and execution of computer-implemented services as provided by an IHS environment. Specifically, embodiments of the invention enable the efficient use of the IHSs in the IHS environment by utilizing hardware resource information to determine how to best utilize the IHS in the context of the IHS environment. Such use may be performed using stackable system roles, which utilize minimal data (e.g., a minimum number of bits), thus reducing a burden on the memory of the IHS. Further, such stackable system roles may be dynamic, enabling a best use of the IHSs as the needs of the IHS environment change.

Embodiments of the invention may provide secure methods of applying such roles (i.e., SSRs) to the IHSs using trusted methods to prevent malicious entities from applying inappropriate SSRs. Such secure methods may be efficient and secure to enable quick operation of the IHS environment as desired by the clients.

Thus, embodiments of the invention may address the problem of limited computing resources in a distributed system. The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for managing information handling systems, the method comprising:
   obtaining, by a stackable system role (SSR) manager of an information handling system, an SSR instruction;
   performing an encoding on the SSR instruction using a public key to obtain an encoded instruction value;
   providing an encoded SSR instruction to a local hardware resource manager of the information handling system, wherein the encoded SSR instruction comprises the SSR instruction, a SSR entry and the encoded instruction value,
   wherein the SSR entry comprises a SSR,
   obtaining, from the hardware resource manager, a response, wherein the response specifies whether the encoded SSR instruction is valid, and
   based on the response, initiating an execution of the SSR instruction,
   wherein the execution of the SSR instruction comprises at least one of: setting the information handling system to the SSR, reading a previously-set SSR of the information handling system, and resetting the SSR of the information handling system to null.

2. The method of claim 1, wherein the SSR comprises at least one of:
   a worker setting, a storage setting, a manage setting, and an external access setting.

3. The method of claim 2, wherein the SSR further comprises a SSR uncertainty field.

4. The method of claim 1, wherein the SSR entry further comprises vendor certification information.

5. The method of claim 1, wherein the public key is obtained from the local hardware resource manager.

6. A non-transitory computer readable medium comprising computer readable program code, which when executed by a computer processor enables the computer processor to perform a method for managing information handling systems, the method comprising:
   obtaining, by a stackable system role (SSR) manager of an information handling system, a SSR instruction;
   performing an encoding on the SSR instruction using a public key to obtain an encoded instruction value;
   providing an encoded SSR instruction to a local hardware resource manager of the information handling system, wherein the encoded SSR instruction comprises the SSR instruction, a SSR entry and the encoded instruction value,
   wherein the SSR entry specifies a SSR;
   obtaining, from the hardware resource manager, a response, wherein the response specifies whether the encoded SSR instruction is valid, and
   based on the response, initiating an execution of the SSR instruction,
   wherein the execution of the SSR instruction comprises at least one of: setting the information handling system to the SSR, reading a previously-set SSR of the information handling system, and resetting the SSR of the information handling system to null.

7. The non-transitory computer readable medium of claim 6, wherein the SSR comprises at least one of: a worker setting, a storage setting, a manage setting, and an external access setting.

8. The non-transitory computer readable medium of claim 7, wherein the SSR further comprises a SSR uncertainty field.

9. The non-transitory computer readable medium of claim 6, wherein the SSR entry further comprises vendor certification information.

10. The non-transitory computer readable medium of claim 9, wherein the public key is obtained from the local hardware resource manager.

11. An information handling system, comprising:
    a processor; and
    memory including instructions, which when executed by the processor, perform a method comprising:
       obtaining, by a stackable system role (SSR) manager of the information handling system, a SSR instruction;
       performing an encoding on the SSR instruction using a public key to obtain an encoded instruction value;
       providing an encoded SSR instruction to a local hardware resource manager of the information handling system,
       wherein the encoded SSR instruction comprises the SSR instruction, a SSR entry and the encoded instruction value,
       wherein the SSR entry specifies a SSR;
       obtaining, from the hardware resource manager, a response, wherein the response specifies whether the encoded SSR instruction is valid, and
       based on the response, initiating an execution of the SSR instruction,
       wherein the execution of the SSR instruction comprises at least one of: setting the information handling system to the SSR, reading a previously-set SSR of the information handling system, and resetting the SSR of the information handling system to null.

12. The information handling system of claim 11, wherein the SSR comprises at least one of: a worker setting, a storage setting, a manage setting, and an external access setting.

13. The information handling system of claim 12, wherein the SSR further comprises a SSR uncertainty field.

14. The information handling system of claim 11, wherein the public key is obtained from the local hardware resource manager.

* * * * *